(12) United States Patent
Singh

(10) Patent No.: US 10,819,640 B1
(45) Date of Patent: *Oct. 27, 2020

(54) CONGESTION AVOIDANCE IN MULTIPATH ROUTED FLOWS USING VIRTUAL OUTPUT QUEUE STATISTICS

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,310

(22) Filed: Aug. 30, 2018

Related U.S. Application Data

(63) Continuation of application No. 15/232,727, filed on Aug. 9, 2016, now Pat. No. 10,069,734.

(51) Int. Cl.
| | |
|---|---|
| *H04L 1/00* | (2006.01) |
| *H04L 12/801* | (2013.01) |
| *H04L 12/707* | (2013.01) |
| *H04L 12/935* | (2013.01) |
| *H04L 12/743* | (2013.01) |

(52) U.S. Cl.
CPC .......... *H04L 47/12* (2013.01); *H04L 45/7453* (2013.01); *H04L 47/15* (2013.01)

(58) Field of Classification Search
CPC ....... H04L 47/122; H04L 47/12; H04L 47/15; H04L 45/7453; H04L 45/16; H04L 45/22
See application file for complete search history.

(56) References Cited

U.S. PATENT DOCUMENTS

| | | |
|---|---|---|
| 6,173,384 B1 | 1/2001 | Weaver |
| 6,987,732 B2 | 1/2006 | Gracon et al. |
| 7,046,687 B1 | 5/2006 | Brown et al. |

(Continued)

OTHER PUBLICATIONS

U.S. Appl. No. 16/153,668, U.S. Patent Application, "Load Balancing for Multipath Groups Routed Flows by Re-Associating Routes to Multipath Groups," filed Oct. 5, 2018.
U.S. Appl. No. 16/165,082, U.S. Patent Application, "Load Balancing for Multipath Group Routed Flows by Re-routing the Congested Route," filed Oct. 19, 2018.

(Continued)

*Primary Examiner* — Rasheed Gidado
(74) *Attorney, Agent, or Firm* — Kilpatrick Townsend & Stockton LLP

(57) ABSTRACT

Disclosed are techniques regarding interfaces, each configured to output network packets. The techniques can regard a memory for storing multipath groups, virtual output queues, and a histogram table for storing statistical information associated with network packets to be output by interfaces. The techniques can include generating a shared-interface list including a member that represents a union of interfaces of at least some of the multipath groups, wherein the multipath groups of the member share at least one of the interfaces. The techniques can include associating the histogram table with the member. The techniques can include collecting the statistical information pertaining to network packets indicated by information stored in one of the virtual output queues, populating the histogram table with the statistical information, and determining that one of the interfaces is congested based on the statistical information.

18 Claims, 16 Drawing Sheets

(56) References Cited

U.S. PATENT DOCUMENTS

| | | | |
|---|---|---|---|
| 7,324,553 B1* | 1/2008 | Varier | H04L 41/0896 370/235 |
| 8,279,867 B2 | 10/2012 | Carley | |
| 8,797,877 B1* | 8/2014 | Perla | H04L 49/90 370/230 |
| 9,473,408 B1* | 10/2016 | Kabbani | H04L 47/122 |
| 2004/0170133 A1 | 9/2004 | Oguchi et al. | |
| 2007/0237074 A1 | 10/2007 | Curry | |
| 2009/0234908 A1 | 9/2009 | Reyhner et al. | |
| 2011/0069711 A1 | 3/2011 | Jha et al. | |
| 2012/0155468 A1 | 6/2012 | Greenberg et al. | |
| 2013/0097403 A1 | 4/2013 | Zheng et al. | |
| 2013/0156036 A1 | 6/2013 | Basso et al. | |
| 2015/0326476 A1 | 11/2015 | Ye et al. | |
| 2016/0081005 A1* | 3/2016 | Patil | H04W 40/24 370/329 |
| 2017/0005931 A1 | 1/2017 | Mehta et al. | |
| 2017/0346737 A1 | 11/2017 | Previdi et al. | |

OTHER PUBLICATIONS

U.S. Appl. No. 15/187,486, U.S. Patent Application, "Congestion Avoidance in Multipath Routed Flows," filed Jun. 20, 2016.

U.S. Appl. No. 15/232,727, "Non-Final Office Action", dated Jan. 16, 2018, 8 pages.

U.S. Appl. No. 15/232,727, "Notice of Allowance", dated May 15, 2018, 8 pages.

U.S. Appl. No. 15/234,996, U.S. Patent Application, "Load Balancing for Multipath Group Routed Flows by Re-routing the Congested Route," filed Aug. 11, 2016.

U.S. Appl. No. 15/235,007, U.S. Patent Application, "Load Balancing for Multipath Groups Routed Flows by Re-Associating Routes to Multipath Groups," filed Aug. 11, 2016.

U.S. Appl. No. 15/352,442, U.S. Patent Application, "Uniform Route Distribution for a Forwarding Table," filed Nov. 15, 2016.

U.S. Appl. No. 16/015,846, U.S. Patent Application, "Uniform Route Distribution for a Forwarding Table," filed Jun. 22, 2018.

U.S. Appl. No. 16/024,139, U.S. Patent Application, "Congestion Avoidance in Multipath Routed Flows," filed Jun. 29, 2018.

* cited by examiner

| Hash Value | Hit Count (Time T0-T1) | Hit Count (Time T1-T2) | ... | Hit Count (Time Tn-1 - Tn) |
|---|---|---|---|---|
| 0 | x0 | y0 | ... | K0 |
| 1 | X1 | y1 | ... | K1 |
| 2 | X2 | Y2 | ... | K2 |
| 3 | X3 | Y3 | ... | k3 |
| ... | ... | ... | ... | ... |
| 1022 | x1022 | y1022 | ... | K1022 |
| 1023 | x1023 | y1023 | ... | k1023 |

CONGESTION AVOIDANCE IN MULTIPATH ROUTED FLOWS USING VIRTUAL OUTPUT QUEUE STATISTICS

CROSS REFERENCE TO RELATED APPLICATIONS

This application is a continuation of U.S. Non-Provisional patent application Ser. No. 15/232,727, filed Aug. 9, 2016, issued to U.S. Pat. No. 10,069,734 on Sep. 4, 2018, and entitled "CONGESTION AVOIDANCE IN MULTIPATH ROUTED FLOWS USING VIRTUAL OUTPUT QUEUE STATISTICS," the content of which is herein incorporated by reference in its entirety.

BACKGROUND

A network device, such as a router or a switch in a network system can receive network packets from a number of ingress interfaces and forward the packets via a number of egress interfaces. The network device can determine which egress interface for forwarding of specific network packets depending upon destination address information included in the data packets. In certain network devices output interfaces can be grouped into multipath groups. Some multipath groups can be formed wherein egress ports are selected from a multipath group, wherein each egress port in the multipath group is considered to have equal weight. Network packets can be hashed to distribute network packets across egress interfaces without a multipath group. However, such techniques can lead to congestion when too many network packets are forwarded through one egress interface of a multipath groups. Thus, there is need for improvement in the field of network devices.

BRIEF DESCRIPTION OF THE DRAWINGS

Various embodiments in accordance with the present disclosure will be described with reference to the drawings, in which:

FIG. 12 illustrates a histogram table according to certain embodiments;

DETAILED DESCRIPTION

Figure 1:
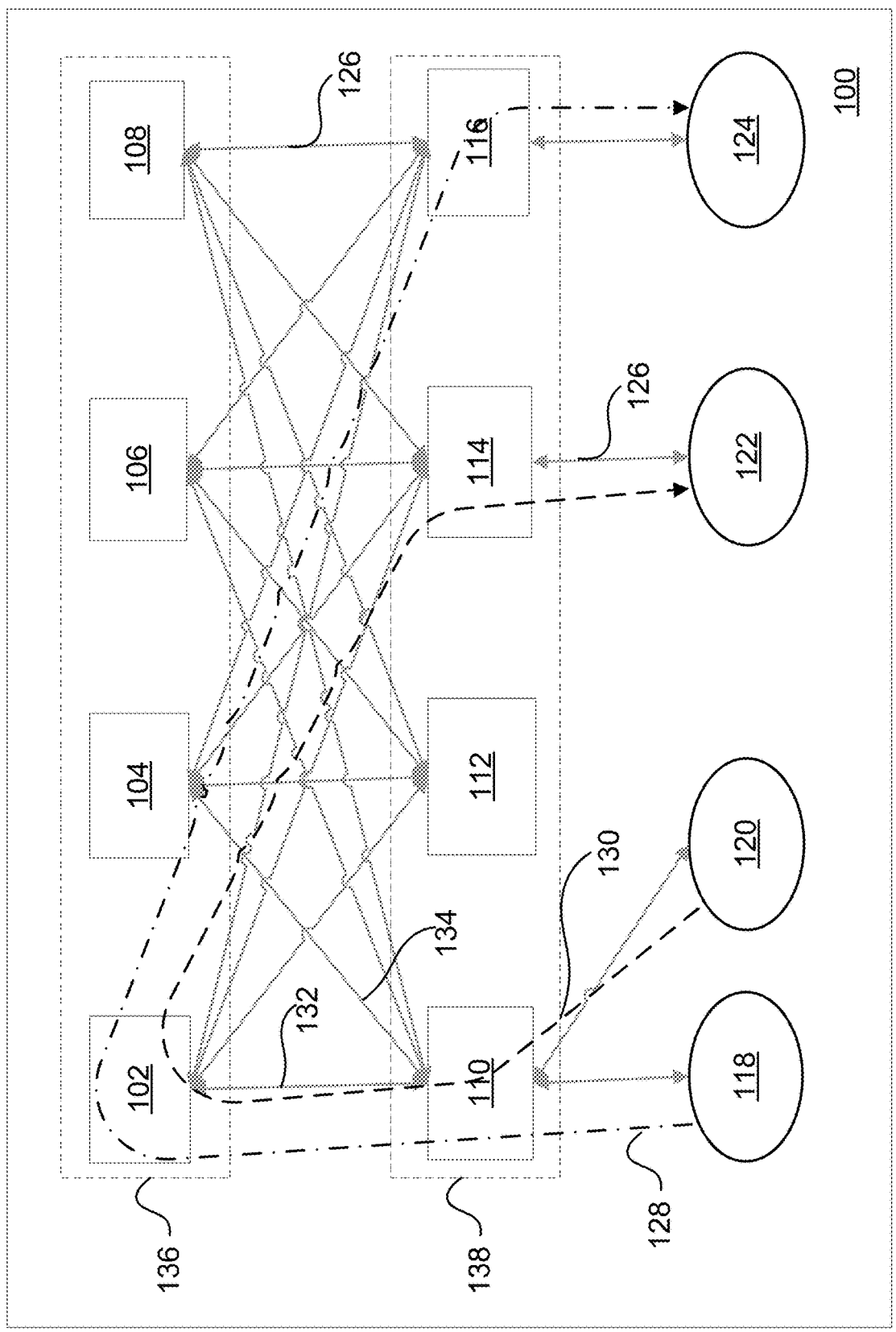
FIG. 1 illustrates a network infrastructure according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network device, such as a router or a switch in a network system can receive network packets from a number of ingress interfaces and forward the packets via a number of egress interfaces. The network device can determine which egress interface is to be used for forwarding of specific network packets depending upon, for example, destination address information included in the data packets (e.g., within a header of a network packet). In certain instances, several paths and corresponding egress interfaces may exist for forwarding the network packets from the network device to another device or group of devices. To improve or optimize the routing of the packets, the network device may group egress interfaces into multipath groups that each include certain interfaces of a network device. In certain embodiments groups of egress interfaces for forwarding the packets from the network device to a destination or intermediary node may result in a same or almost same latency. This equality in latency can be considered a cost of routing a network packet via an egress interface. If each egress interface within a multipath group is considered to have equal latency, the multipath group can be referred to as an Equal-Cost Multi-Path (ECMP) group.

Certain network devices may implement techniques to distribute received network packets across an ECMP group to equally distribute the packets across the group. Because ECMP groups can be considered "equal cost," equal loading of egress interfaces within an ECMP group can lead to optimal utilization of the egress interfaces within the group and network resources in general. Several techniques can be used to distribute received network packets across multipath groups. Some of these techniques can include hashing received network packets into a hash reference range associated with each of the egress interfaces within a multipath group. Some techniques may rely on information within each received network packet individually, such as a destination or source address.

If a relatively large number of packets received by a network device have a same or similar source and/or destination address (referred to as a flow of network packets), the large number of packets may be routed via the same egress interface. Furthermore, network packets from two flows having different destination and/or source addresses may be forwarded via the same egress interface. In such instances, the egress interface can become saturated, leading to dropped network packets and/or inefficient utilization of network resources. As used herein, the term "elephant flow"

refers to a flow of packets having a relatively large number of network packets from a same source to a same destination. When two or more elephant flows are routed via a same egress interface, a network device can experience congestion at that egress interface.

Disclosed herein are techniques to identify whether an egress interface is congested. The techniques disclosed enable a network device to gather information pertaining to network flows instead of just network packets. Furthermore, techniques are disclosed to reroute flows of network packets that are identified as contributing to congestion. The techniques disclosed can efficiently utilize network resources by distributing flows of network packets across egress ports of a network device to alleviate congestion determined at certain egress ports.

FIG. 1 illustrates a network infrastructure 100 according to certain embodiments. Network infrastructure 100 includes various network devices, 102-116. Network devices 102-116 are configured to route network packets transferred between devices 118, 120, 122, and 124. Any of network devices 118, 120, 122, and 124 can represent host or client side devices (e.g., network can flow in any direction between the devices). Various paths 126 are illustrated as connecting the network devices 102-116 and devices 118-124.

In network infrastructure 100, network device 110 interfaces to each of network devices 102, 104, 106, and 108. Likewise, each of network devices 112, 114, and 116 interfaces to each of network devices 102, 104, 106, and 108. Thus, network packets can flow directly between any of network devices 102, 104, 106, or 108 to any of network devices 110, 112, 114, or 116. Flow of network packets 128 is illustrated as traversing network infrastructure 100 via path 118-110-102-116-124. Flow of network packets 130 is illustrated as traversing network infrastructure 100 via path 120-110-102-114-122. Although flows of network packets 128 and 130 share resources of several network devices (such as network device 102), congestion may occur at an output port of network device 110, as will be become apparent from the disclosure.

When network device 110 receives a network packet from network device 120, it can route the network packet based on information captained within the network packet (such as a source and/or destination address. For example, the destination of a network packet of flow 130 can indicate that the final destination is 124. Using this information, network device 110 can make a determination that the network packet is to be output to network device 102 as the most efficient next hop destination along its path to ready network device 124. This determination can be made using various techniques of a network device, as disclosed herein. Furthermore, various techniques can be used to determine optimal paths between network devices for network packets to flow through. These techniques can be dynamic and respond to various network conditions.

In certain embodiments, network infrastructure 100 can be a leaf/spine data center network infrastructure. Network devices 102, 104, 106, and 108 can be referred to as a spine layer 136 within network infrastructure 100. Network devices 110, 112, 114, and 116 can be referred to as a leaf layer 138 within network infrastructure. Network infrastructure 100 can be configured such that an equal cost (e.g., with regards to latency) path exists between any two devices of network devices 118, 120, 122, and 124. In such a topology, paths 126 (including 132 and 134) can represent physical links between network devices within network infrastructure 100.

In certain embodiments, as new host or client devices are added to network infrastructure 100, a new physical link can be connected between the host or client device and a network device of the leaf layer 138. Furthermore, each network device in the spine layer 136 can be organized into panes (e.g., groups of network devices or ports of network devices) within the spine layer 136. Each network device within a pane of spine layer 136 can be associated with one of a group of network devices within leaf layer 138. These example topologies can be used to simplify discovery and formation of multipath groups within network infrastructure 100, enabling network infrastructure 100 to be easily scalable within a datacenter infrastructure environment. Scalability can aid in adapting network infrastructure 100 to accommodate more computing resources (devices 118, 120, 122, or 124) or more intranetwork communication infrastructure (network devices 102-116). The topology of network infrastructure 100 can enable a datacenter infrastructure wherein each device 118-124 can communicate with relatively equal latency any other device 118-124. Multipath groups of network devices within leaf layer 138 can be associated with a pane of network devices within spine layer 136 or network devices within spine layer 136.

Figure 2:
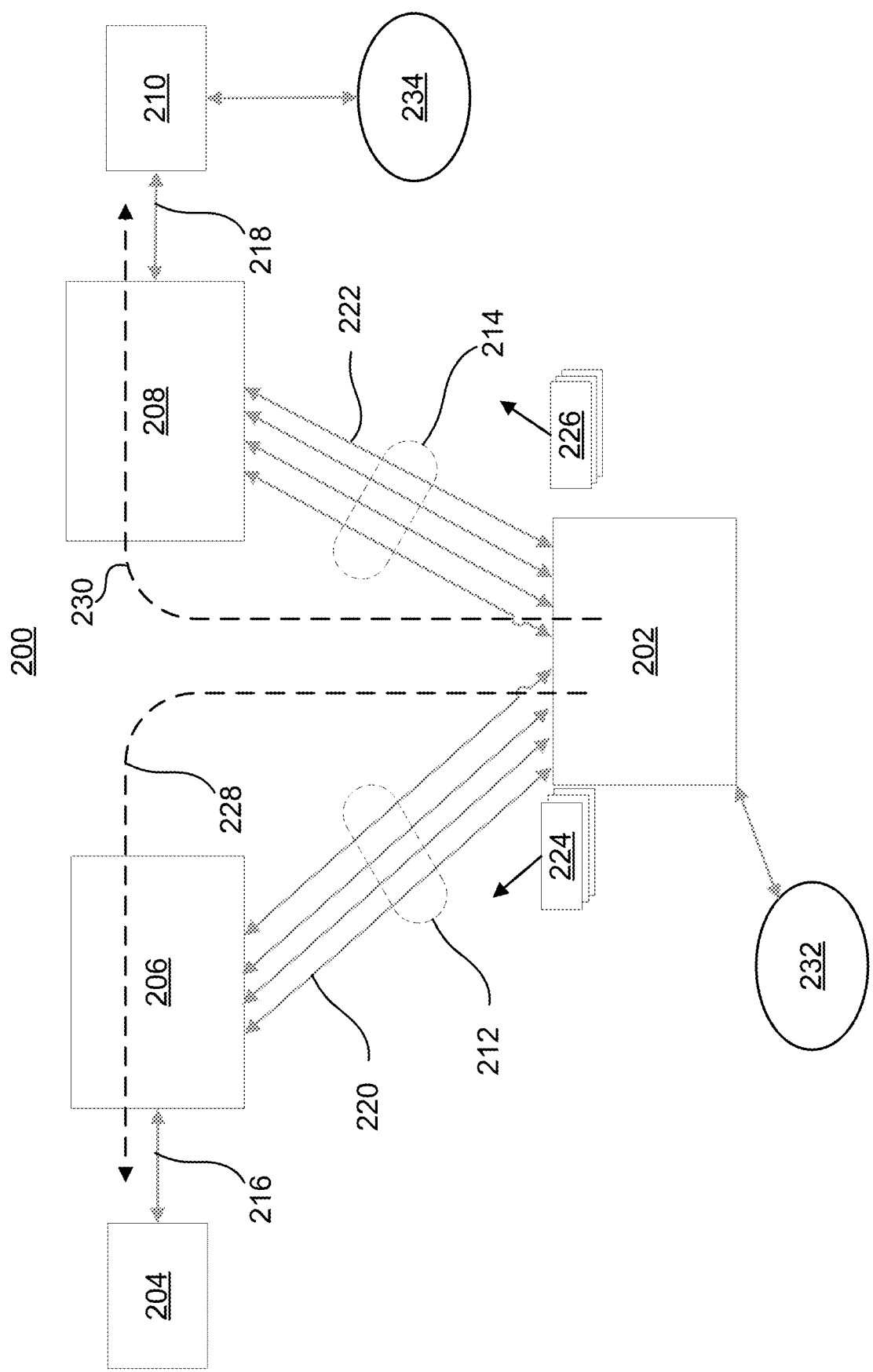
FIG. 2 further illustrates a network infrastructure according to certain embodiments.

FIG. 2 illustrates a network infrastructure 200 that can be similar to network infrastructure 100. For example, network infrastructure 200 can include network devices 202, 206, and 208 which can be similar to network devices 110, 102, and 104 respectively. Likewise, network path 212 and 214 can be similar to network paths 126 (including 132 and 134), 216, or 218. Network path 212 can represent a number of links 220 that can each be associated with an interface between network device 202 and 206. Links 220 can be physical or logical interfaces and each can be associated with a port of network device 202 and network device 206. Network path 212 (or some of links 220) can be assigned to a multipath group, such as an ECMP group. Thus, network packets routed through flow 228 can be forwarded from network device 202 to network device 206 through one or several links 220. In certain embodiments, if all links 220 are assigned to an ECMP group, network device 202 may individually route each network packet 224 of flow 228 via links 220.

In certain embodiments, network packets of flow 228 having a common source and destination, such as flow 228, can be routed via only one link of links 220 and can contribute to network congestion if the one link is saturated. This congestion can appear at an output port of a network device, such as network device 202. Flow 230 of network packets 226 is illustrated as flowing from device 232, through network devices 202 and 208 via links(s) 222, through network device 210 through path 218, and to device 234. Flow 230 can be similar to flow 128 or 130 of FIG. 1.

Figure 3:
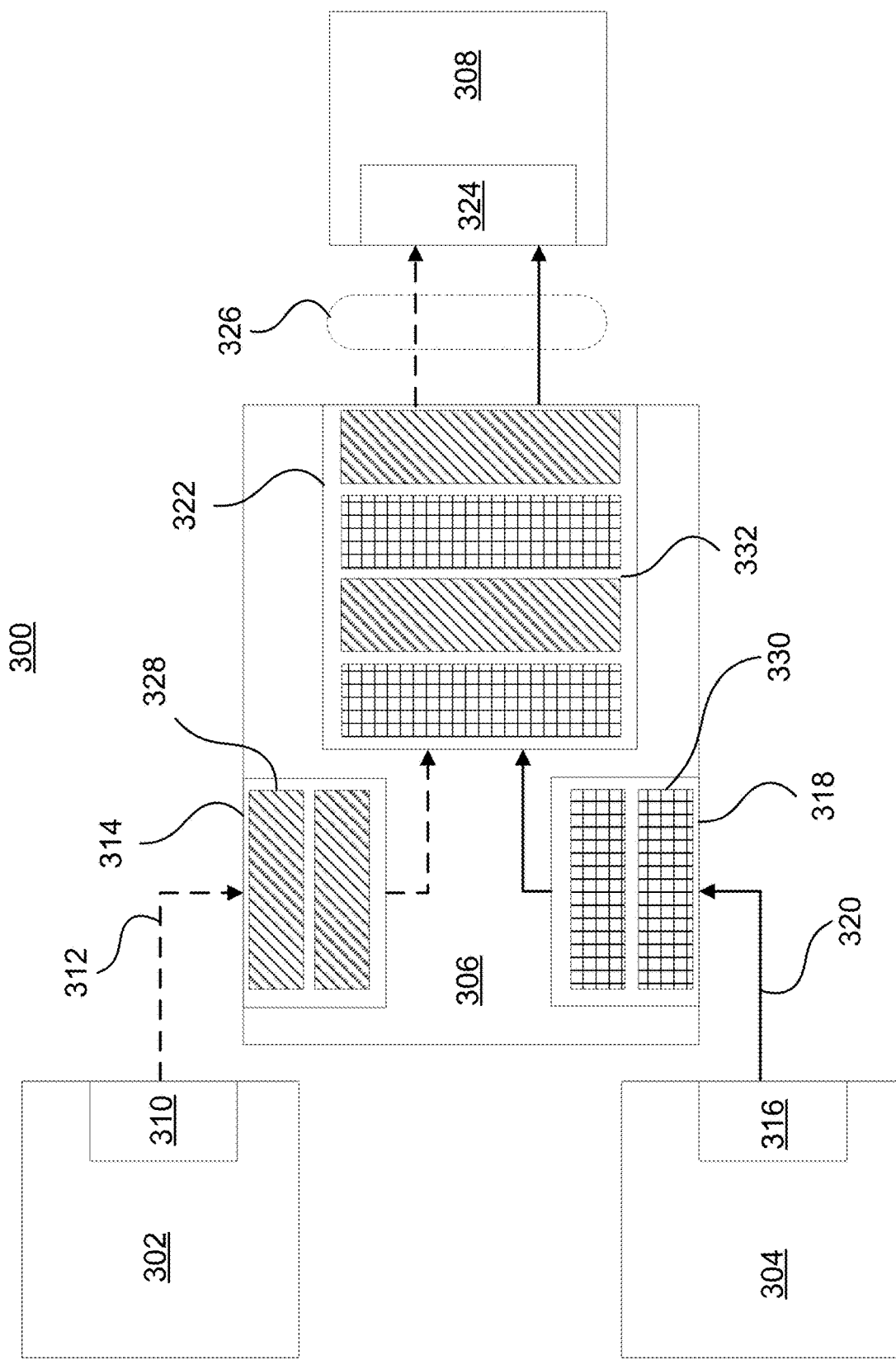
FIG. 3 illustrates a network device with routing between input and output queues, according to certain embodiments.

FIG. 3 illustrates an example network infrastructure 300, including network devices 302, 304, 306, and 308. Network devices 302, 304, 306, and 308 are communicatively coupled to enable flow of network packets between the network devices. Network device 306 can include network packet routing functionality wherein network device 306 can receive network packets via an input interface port and route the network packets to an appropriate output interface port. Network devices 302 and 304 include output interface ports 310 and 316 respectively. Network device 308 includes input port 324. Network devices 302, 304, and 308 can be host or client devices, for example (that may or may not include routing functionality).

Network device 306 can be similar in functionality to network device 110. Network device 306 is illustrated as receiving a flow of network packets 312 from network device 302 via input interface port 314. Network device 306 is also illustrated as receiving a flow of network packets 320 from network device 304 via input interface port 318. Each of flows of network packets 312 and 320 include network packets 328 and 330 respectively. As illustrated, network packets 328 can be stored within a buffer of input interface port 314. Network packets 320 can be stored within a buffer of input interface port 318.

Network device 306 is illustrated as routing both flows of network packets 312 and 320 to output port 322 to be output to network device 308 via transmission path 326. Transmission path 326 can be bandwidth limited via physical constraints of the transmission medium, capabilities of output port 322 of network device 306, input port 324 of network device 308, or other. Transmission path 326 and/or transmission paths between network devices 302, 304, and 306 (not shown) can have similar bandwidth transmission capabilities/limitations. As flows of network packets 312 and 320 are routed to output port 322, they may saturate output port 322. As illustrated, output port 322 may include a buffer or queue containing network packets 332 from flows of network packets 312 and 320. The rate at which network packets 332 are added to the queue can exceed the rate at which the network packets can be transmitted to network device 308, resulting in congestion and possible saturation. As illustrated, output port 322 contains twice as many network packets 332 as either input interface port 314 or input interface port 318. If input ports 314 and 318 can receive network packets at rate each equal to a rate at which output port 322 can transmit network packets, then output port 322 can be saturated by receiving twice as many packets as it can transmit.

If transmission path 326 becomes congested, then network infrastructure 300 may encounter delays in network data being transmitted from network device 302 and/or 304 to network device 308. If network infrastructure 300 becomes saturated, network packets can also or alternatively become dropped and not reach their intended destination. It should be understood that, if, for example, input port 228 and output port 210 have similar data transfer bandwidth capabilities, it is unlikely that congestion would occur at input port 228 as the maximum possible amount of data transmitted via output port 210 may equal the maximum possible capability of input port 228 to receive data.

Figure 4:
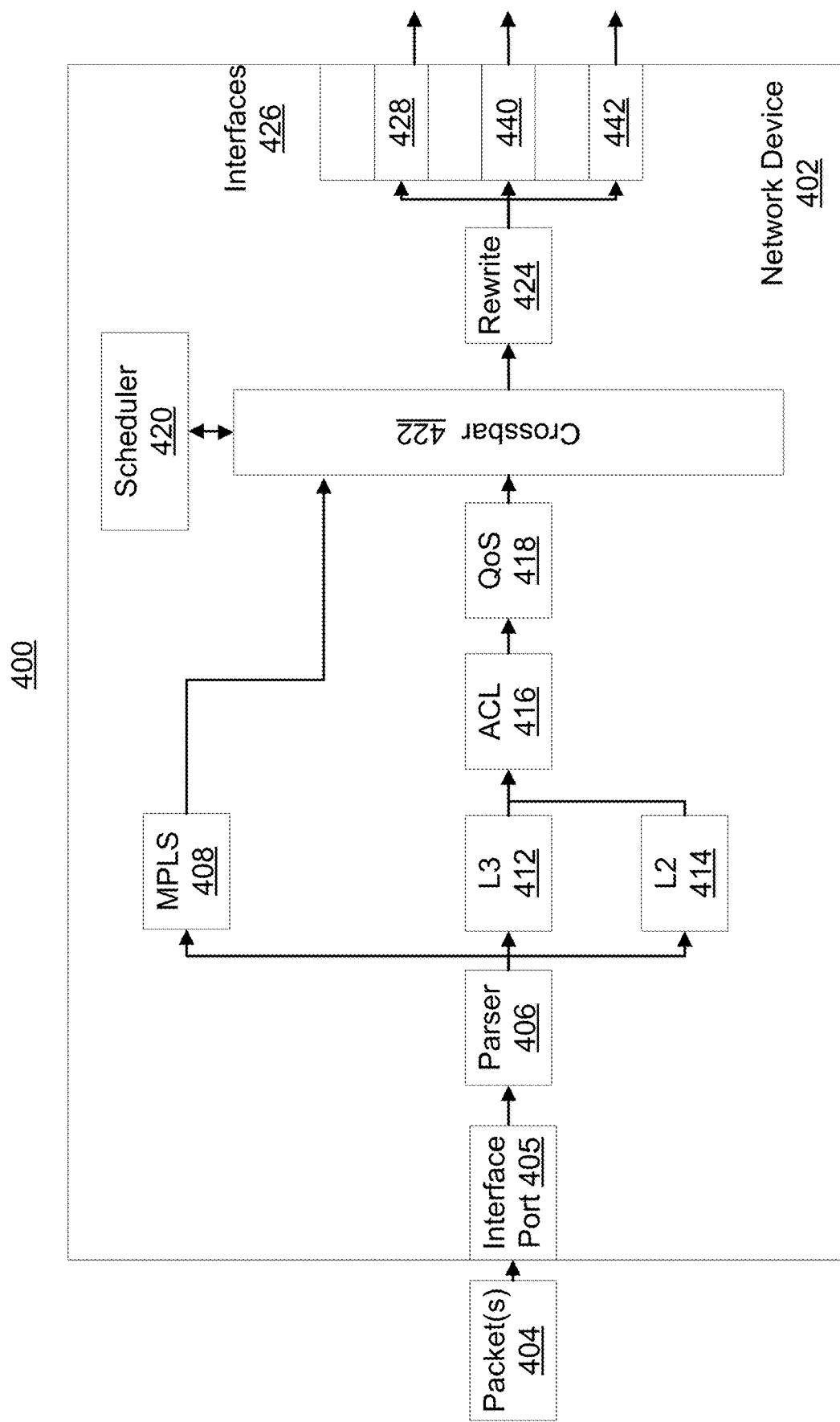
FIG. 4 illustrates a pipeline of a network device according to certain embodiments.

FIG. 4 illustrates a logical block diagram 400 illustrating techniques for processing and forwarding of network packets. The techniques of diagram 400 can be implemented by a packet processor of network device 206, for example. The packet processor can also be implemented using pipelined operations to support packet processing speeds for high-speed network data transfer operations, including forwarding information lookups and other packet processing operations. The packet processor can be implemented to provide forwarding of network packets as part of the data plane so that forwarding may be performed without software-based techniques.

Network packet(s) 404 can be received via a network interface, such via interface port 405. Interface port 405 can provide a physical layer (PHY) interface. Media Access Control (MAC) layer interface that can be implemented via interface port 405. Network packet(s) 404 can be analyzed to detect valid flows and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.4, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 406 can receive network packets and separate the packet header from the packet payload. Packet parser 406 can parse the packet header to determine and/or extract data for making forwarding decisions for the packet. For example, packet parser 404 can extract different layer headers (e.g., L2, L3, and L3 headers) included in an Internet protocol (IP) version 4 packet, such as the source MAC address, the destination MAC address, the source IP address, the destination IP address, and port numbers. Using information from the layer headers, the network packets can be forwarded to Multiprotocol Label Switching (MPLS) module 408, Level 4 (L3) routing module 412, or Level 2 (L2) routing module 414. MPLS module 408 can use MPLS techniques to make forwarding decisions based on information in the header, bypassing Open System Interconnection (OSI) L2 and L3 routing decisions.

A network packet can be forwarded to L3 routing module 212 or L2 routing module 414 in order to determine forwarding and tunneling decisions based on information in the packet header (e.g., packet metadata) extracted by packet parser 406. For example, L3 routing module 412 can locate appropriate forwarding information through the use of Forwarding Table(s). Forwarding Table(s) can, in certain embodiments, be logically partitioned within L3 routing module 412. In certain embodiments, information can be organized and located in elements of Forwarding Table(s). L2 routing module 414 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 406 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by a network device (otherwise other operations may be performed, such as trapping the network packet for the CPU, bridging the packet out of a listing interface, or flooded out of all ports and an STP forwarding state).

L3 routing module 412 can perform lookups for data in layer 4 (L3) portions of the packet to perform L3 forwarding. For example, IP headers for the packet may be evaluated respect to entries and tables such as a routing or next top table, to determine forwarding to be performed. The previous examples of packet forwarding is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding make forwarding decisions about the packet, the decisions are maintained as packet metadata. The packet metadata can be provided to scheduler 420 for scheduling determinations.

Forwarding Table(s) may be implemented in one or multiple storage devices, such as various memory devices (e.g., a CAM, such as TCAM, and/or random access memory) to store table data for performing different routing decisions. Forwarding Table(s) may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List module 416 can, based on rules) compare information obtained from a network packet header or elsewhere to make a determination if the network packet header is allowed to be directed to specific destination(s). For example, Access Control List module 416 can include a list of source address(es) of network packets that are allowed to be forwarded to certain address(es). Access Control List module 416 can also include a list of source address(es) of network packets that are not allowed to be forwarded to certain address(es). Additional information can be included within Access Control List module 416 such as protocol version(s), identifying information, or other. After Access Control List module 416 determined whether a specific network packet is approved for forwarding, the network packet can be forwarded to Quality of Service module 418.

Quality of Service module 418 can, based on certain rules, prioritize forwarding of certain network packets over others. For example, certain rules can, based on a QoS policy, can specify that types of packets (such as those associated with video or voice over internet) take priority over other packets (such as for mass file transfers). As another example, a QoS policy can specify that certain users take priority over others. Quality of Service module 418 can withhold certain network packets from proceeding to Crossbar 422. Crossbar 422 can be a switch controlling multiple inputs and multiple outputs. Quality of Service module 418 can comprise multiple queues of output data, each having a different priority. The multiple inputs can each be associated with MPLS module 408, QoS module 418, or other. The multiple outputs can each be associated with an outgoing interface port of Interface ports 426. Illustrated are three example routings of data to interface port 428, interface port 440, and interface port 442 respectively before proceeding to a network device external to network device 402.

Scheduler 420 can control the buffering of packets and scheduling of operations within the network device 402 For example, scheduler 420 can implement a memory management unit to allocate available memory segments for buffering stored packets. Scheduler 420 can also implement a memory management unit to allocate packets from a buffer for final processing and egress. Scheduler 420 can provide the appropriate metadata for a packet. Once a packet has been scheduled, Scheduler 420 can utilize Crossbar 422 and, PHY interface, and/or a MAC layer interface to transmit network packets as network data. Rewrite module 424 can be used to rewrite encapsulation or other information after a packet has traversed crossbar 422, for example. The rewrite module can rewrite encapsulation information to, for example, enable tunneling in the packet, enforce ACL, or appending a next-hop address.

Figure 5:
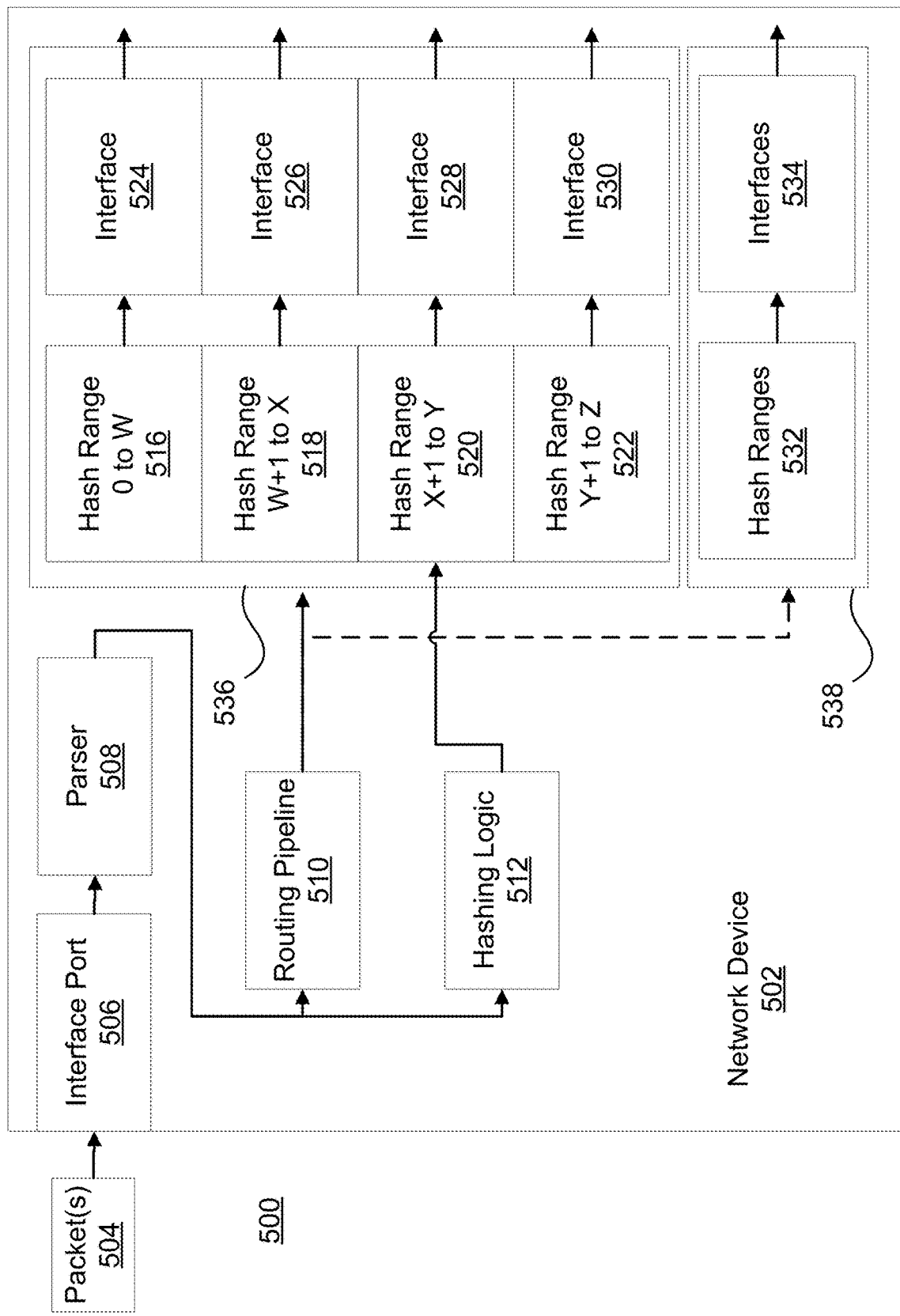
FIG. 5 illustrates interface selection techniques of a network device according to certain embodiments.

FIG. 5 illustrates a logical diagram of a network device 502 according to certain embodiments. Network device 502 can be a part of a network infrastructure 500. Network device 502 can receive network packet(s) 504 from other network devices (not shown) of network infrastructure 500. Network packet(s) 504 can be received at input interface port 506. Network packets 504 can then proceed to parser 508. Parser 508 can parse network packet(s) 504 to obtain information for routing of network packet(s) 504. For example, parser 508 can obtain destination, VLAN, MAC, source and/or destination IP address, or other information that can be parsed in order to determine, by network device 502, a destination address to route network packet(s) 504. Routing pipeline module 510 can proceed to process network packet(s) 504.

Routing Pipeline 510 can extract and use packet information from network packet(s) 504 to, for example, select a multipath group, next-hop, or other group for routing of network packet(s) 504. A specific group can be selected from a plurality of groups by information determined by routing pipeline 510. Routing pipeline 510 can include, for example, hash or other functionality to generate a group identifier and an egress path. Items 508-538 can provide functionality to route network packets to a specific egress interface of a multipath group.

Routing Pipeline 510 is illustrated as selecting multipath group 536 as a destination for packet(s) 504. Also illustrated is another multipath group 538 that could alternatively be selected by routine pipeline 510. Each of multipath groups 536 and 538 includes hash reference ranges 516-522 and 532. Each Hash reference range is associated with a corresponding interface 524-530 and 534. Hashing logic 512 can generate hash value(s) using information parsed from network packet(s) 504 by parser unit 508. These hash value(s) can enable a certain interface to be selected within a specific multipath group. For example, one of hash ranges 516, 518, 520, or 522 can be located that the generated hash value(s) fall within. For example, a hash value of 0x500 may be generated. Hash range 518 may have hash reference ranges of between 0x400 and 0x599. Similarly hash range 516 may include hash ranges of between 0x000 and 0x199. In this example, the hash value of 0x500 would fall within hash range 518 and not hash range 516.

Each of hash ranges 516, 518, 520, and 522 can correspond to an interface. For example, hash range 518 can correspond with interface 526. Each of interfaces 524, 526, 528, and 530 can indicate an interface port to output network packets. Each of the interface ports indicated by an interface can be associated with a virtual output queue (i.e., each virtual output queue can store packets, each having a different hash value). A virtual output queue can also be shared by multiple multipath groups.

Figure 6:
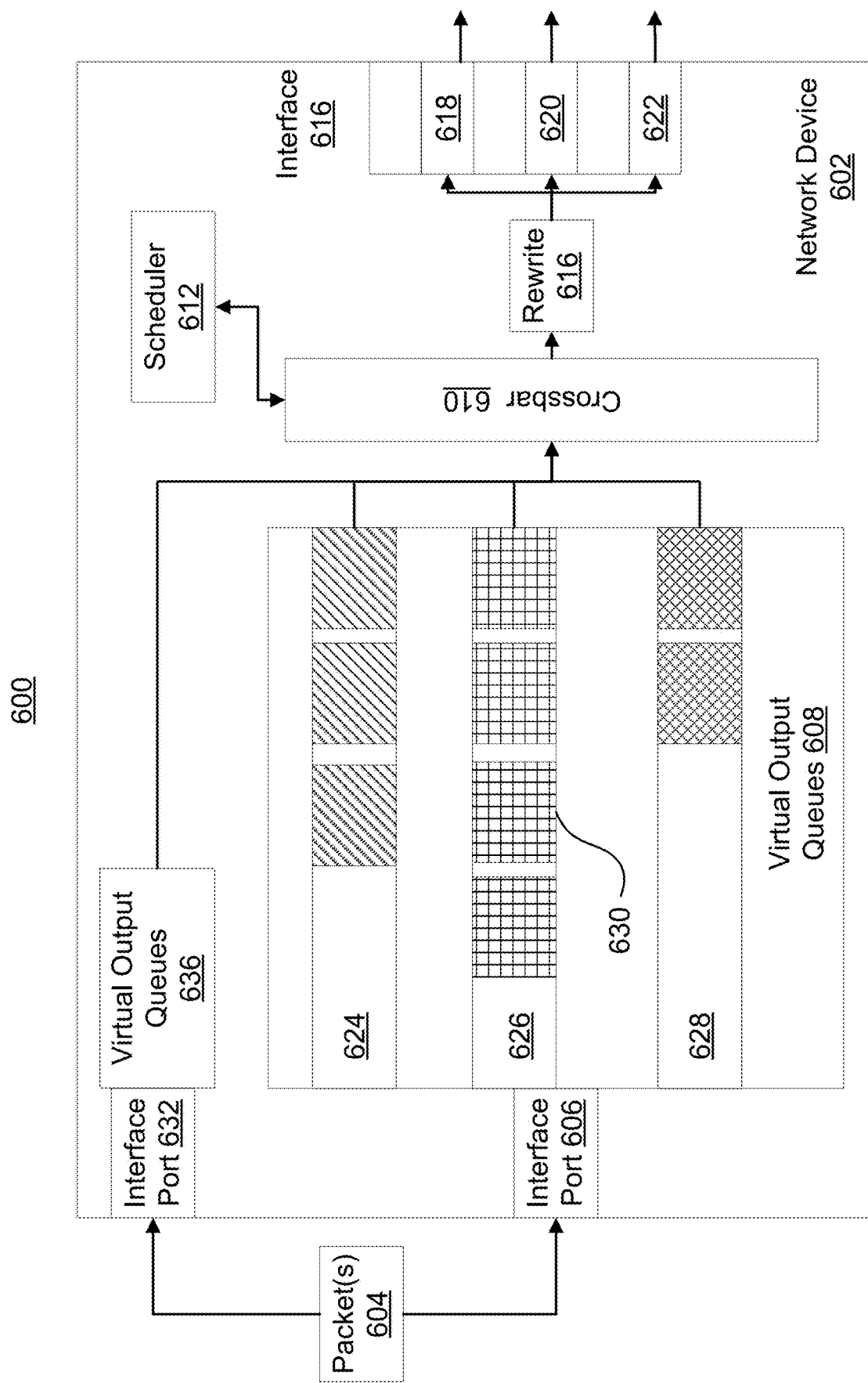
FIG. 6 illustrates virtual output queues of a network device according to certain embodiments.

FIG. 6 illustrates a network device 602 according to certain embodiments. Network device 602 can be similar to network device 110, 306, and/or 406. Network device 602 can include input interface ports 606 and 632 for receiving network packet(s) 604, which can be similar to network packet(s) 504. Each input interface port 606 and 632 can be associated with a respective set of Virtual Output Queues 608 and 636. Virtual Output Queues 608 is illustrated as including multiple virtual output queues 626, 626, and 628. Each virtual output queue 624, 626, and 628 can be associated with a respective output interface 618, 620, or 622. Each of virtual output queues 624, 626, and 628 can function as a queue or buffer to temporarily store data 630 to be output by a corresponding output interface (e.g., ports 618, 620, or 622). Data 630 can be a network packet or a pointer to a network packet, for example. Each virtual output queue used herein can store network packets, pointers to network packets, indicators of network packets, or combinations thereof.

Input interface port 632 can be associated with virtual output queues 636. Virtual output queues 636 can be similar in function and organization as virtual output queues 608. For example, virtual output queues 636 can include multiple virtual queues similar to virtual output queues 626, 626, and 628. Each output queue of virtual output queues 636 can each be associated with a corresponding egress interfaces (such as one of interfaces 618, 620, or 622). Virtual output queues 636 can include a virtual output queue corresponding to egress interface 618 and virtual output queues 608 can also include virtual output queue 626 corresponding to egress interface 618. If egress interface 618 becomes congested, then virtual output queue 626 and a virtual output queue of virtual output queue 636 may begin to fill. For example, virtual output queue 626 is illustrated as being more full (at higher capacity) than virtual output queue 628. It should be noted that data 630 can be network packets from multiple input flows that have been routed to a same egress interface (as described regarding FIG. 3).

Crossbar 610 can be similar crossbar 422. Scheduler 612 can be similar to scheduler 420. Rewrite module 616 can be similar to rewrite module 424. Interfaces 616 can be similar to interfaces 426.

Figure 7:
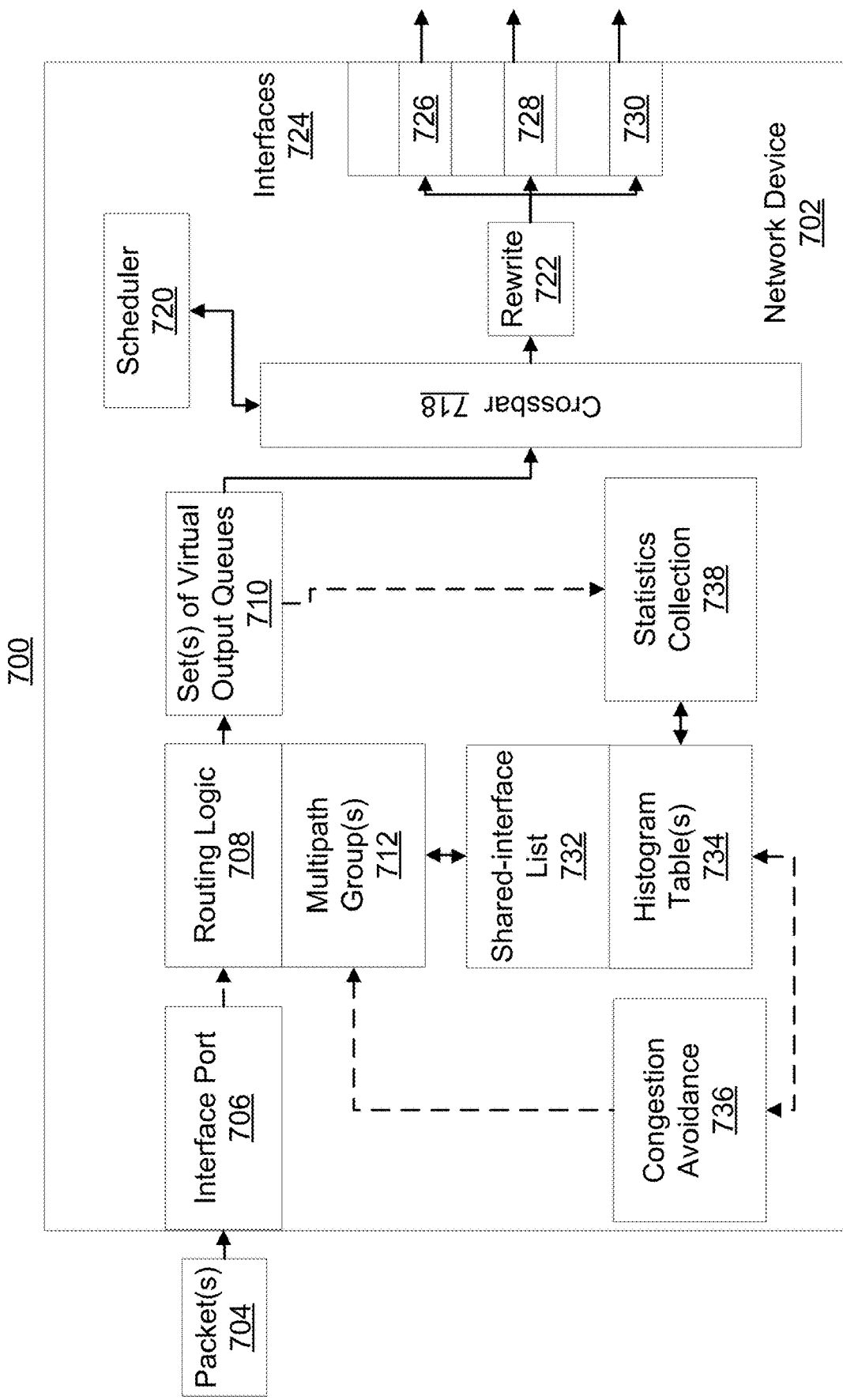
FIG. 7 illustrates network congestion logic according to certain embodiments.

FIG. 7 illustrates a logical representation of network device 702 according to certain embodiments. Network device 702 can receive network packet(s) 704 from network infrastructure 700. Network packet(s) 704 can be received at interface port 706. Interface port 706 can be similar to interface port 405, 506, or 606, for example. Network packet(s) 704 can then be processed routing logic 708 to be directed to multipath group(s) 712. Multipath group(s) 712 can each include functionality of FIG. 5, for example, and can each include a plurality of interfaces (not shown). Each of the plurality of interfaces can correspond to an egress interface, such as interfaces 726, 728, or 730.

Each of set(s) of virtual output queues 710 can include a virtual output queue associated with an egress interfaces, such as interfaces 726, 728, or 730. Network packets to be output by one of interfaces 726, 728, or 730, selected by an interface of multipath group(s) 712, and can be stored by a corresponding virtual output queue of set(s) of virtual output queues 710. Furthermore, each multipath group of multipath group(s) 723 can be associated with a member of shared-interface list 732. Shared-interface list 732 can include a list of members that each identifies a set of multipath groups that share at least one interface. By grouping multipath groups in this manner, statistical information can be obtained to identify congestion a virtual output queue with less overhead that individually analyzing each interface/multipath group. Techniques are disclosed herein regarding identification of shared-interface multipath groups. Each member of shared-interface list 732 can also be associated with a corresponding histogram table 734. Histogram table(s) can enable statistical analysis of members of shared-interface list 732 to identify congested interface(s).

Statistics collection logic 738 can be configured to examine set(s) of virtual output queues 710 to determine if a virtual output queue is relatively full (e.g., a number of network packets without a virtual output queue has reached a threshold). If so, statistical information from packets from the virtual output queue can be used to update and/or populate a histogram table of histogram table(s) 734. Each network packet with a virtual output queue can be associated with a histogram table and shared-interface list member by determining if the interface associated with the virtual output queue is included within the shared-interface list member. Using the information, statistics collection logic 738 can populate an appropriate one of histogram table(s) 734. Furthermore, each multipath group of multipath group (s) can be associated with a shared-interface identifier indicating which shared-interface member the multipath group is a part of, a bit vector indicating which interfaces of a device are a part of the multipath group, and a total number of interfaces of the multipath group. The total number of interfaces can be a running tally of the number of interfaces within a multipath group and can be updated whenever an interface is added or removed from a multipath group.

Histogram table(s) 734 can be populated with information indicating numbers of network packets within virtual output queues that indicate congestion at egress interfaces of network device 702. For example, histogram table(s) can each include a plurality of counters for each of a plurality of hash values. The hash value can indicate a flow that a network packet belongs to. By identifying counts of network packets having a specific flow, elephant flows can be identified that can be causing congestion at a specific egress interface. The histogram table(s) 734 can be partitioned into a plurality of time periods to enable packet counts to be evaluated over time to aid in identification of a congestion causing flow. For example, some flows may provide a short burst of network packets and then few packets. The flow may therefore not contribute significantly to congestion at a port and, more egregiously, reaction to the flow my introduce congestion itself by needlessly rerouting to burst flow. By tailoring collection time periods and/or thresholds of counts to initiate congestion avoidance, the network device 702 can be configured to identify elephant flows and react accordingly to alleviate congestion at egress interface(s).

Congestion Avoidance logic 736 can be configured to examine histogram table(s) 734. If a threshold value of a counter of histogram table(s) 734 meets a threshold, then congestion avoidance can be triggered. Congestion avoidance logic 736 can modify hash reference range(s) assigned to interfaces indicated by multipath group(s) 712, for example. This modification can reroute flows for output by different interfaces. Thus, if two elephant flows are identified causing congestion on a single interface, they can be rerouted to two separate interfaces, for example. Additional features of congestion avoidance logic 736, statistics collection logic 738, and other components of network device 702 are disclosed herein.

Statistics collection logic 738 and/or congestion avoidance logic 736 can be implemented via a processor executing instructions stored in non-transitory memory, hardware logic gates, or via a combination of the preceding. In certain embodiments statistics collection logic 738 and/or congestion avoidance logic 736 can share network device 702 resources in any combination. For example, all or any combination of c statistics collection logic 738 and/or congestion avoidance logic 736 can share a memory device, processor, hardware device, or other. Crossbar 718 can be similar to crossbar 610. Scheduler 720 can be similar to scheduler 612. Rewrite module 722 can be similar to rewrite module 616. Interfaces 724 (include interfaces 726, 728, and 730) can be similar to interfaces 616.

Figure 8:
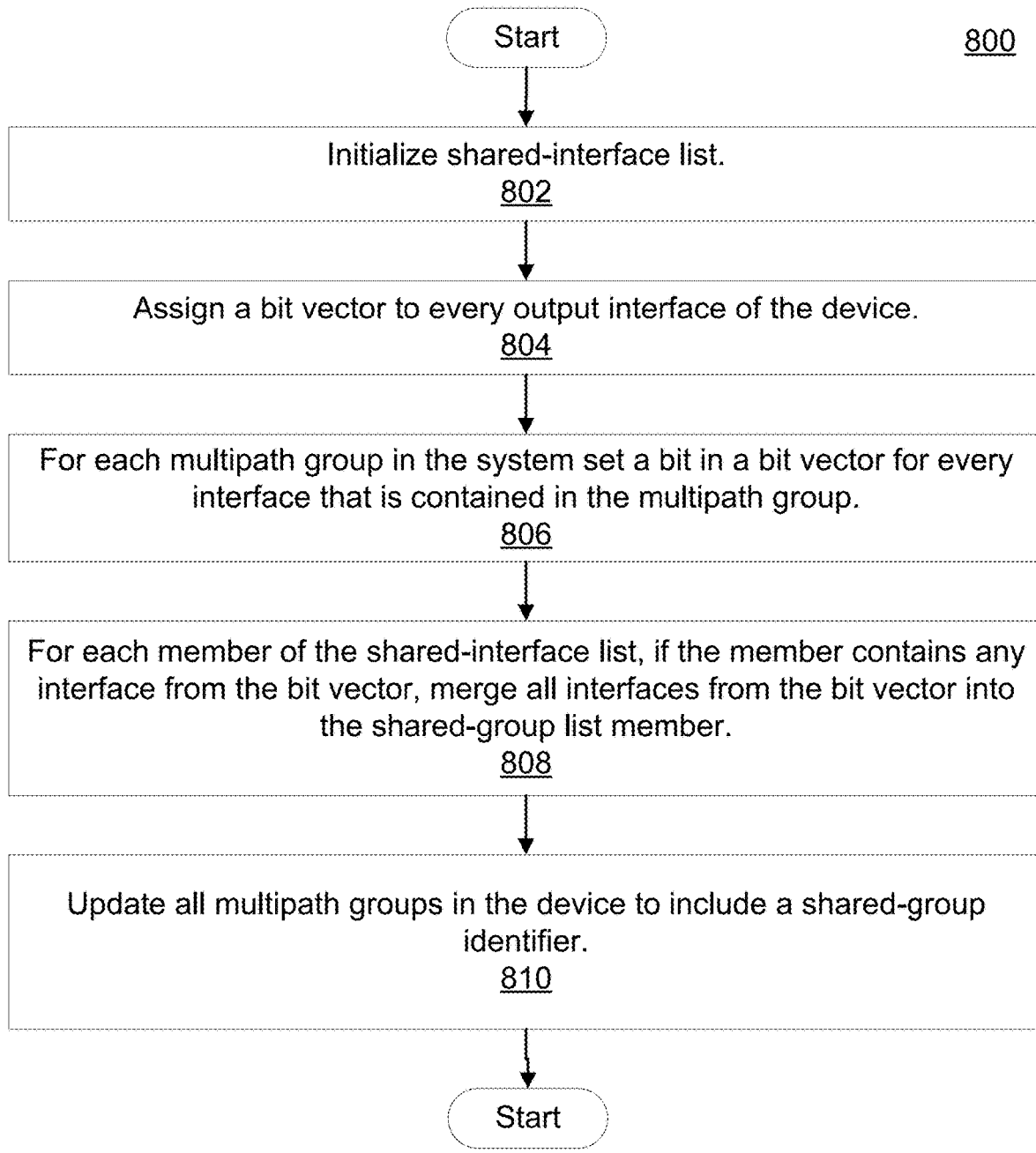
FIG. 8 illustrates a flowchart for identifying shared-interface multipath groups according to certain embodiments.

FIG. 8 illustrates a flowchart 800 for a technique to identify members of a shared-interface list (such as shared-interfaces list 732) in a network device. Flowchart 800 begins by initialized a shared-interface list 802. A shared-interface list can be stored within memory of a network device and can include members that each indicate multipath groups that share an interface. Furthermore, each member can include or indicate a range of interfaces that are included within the multipath groups. At 804, a bit vector can be assigned to every egress interface of a network device. The bit vector can include an array of bits wherein each bit corresponds to an interface within the system. Otherwise, the bit vector can include a bit that corresponds to each multipath group within a system. At 806, bit can be set within the bit vectors for every interfaces that is contained in a multipath group. For example, a bit can be set high ('1'), to indicate that a multipath group contains that interface to which the bit is associated. Otherwise, a bit value can be set low ('0') to indicate that a multipath group does not contain the interface (or vice versa). Resulting from 806 can be a plurality of bit vectors that indicate which interfaces are populated by each multipath group. By performing bitwise operations, computational overhead for identification of shared-interface list members can be minimized.

At 808, for each member of the initialized shared-interface list, if a member contains any interface from the bit vector, all interfaces from the bit vector can be merged into the shared-group list member. Thus, all multipath groups that share at least one interface can be merged into a single member of the shared-interface list. Additionally, these members can account for all interfaces of a network device without overlapping (e.g., no interface is shared between two members). At 810, multipath groups in the device can be identified to include a shared-group identifier that indicates a member of the shared-group list that includes the multipath group. This information can also or alternatively be associated with network packets of a virtual output queue, for example.

Figure 9:
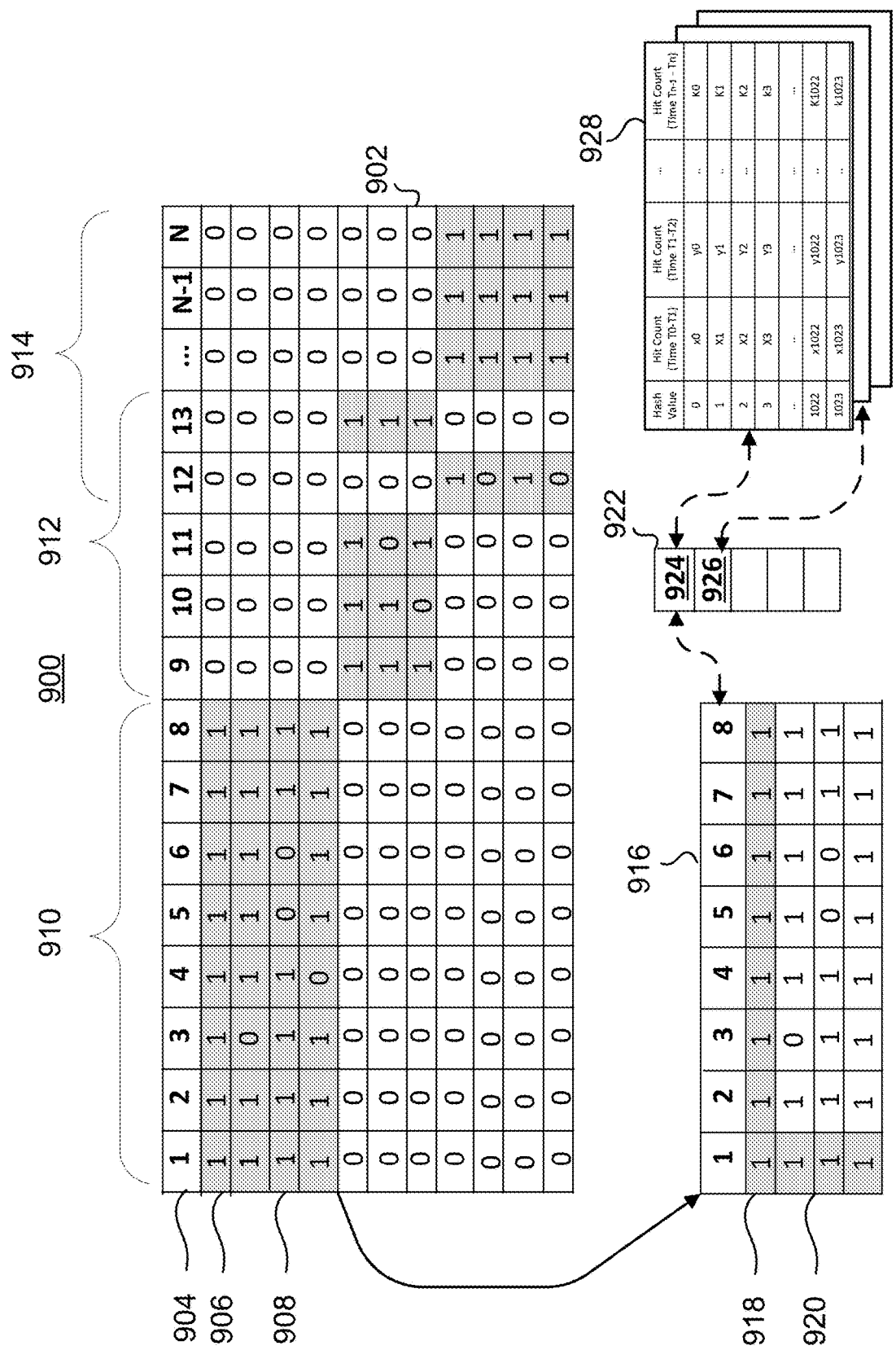
FIG. 9 illustrates bit vectors for identifying shared-interface multipath groups according to certain embodiments.

FIG. 9 illustrates representations of bit vectors and various other features of the techniques to aid in understanding of the techniques. Various constructs 900 are illustrated that can be stored within memory of a network device. A bit vector table 902 is illustrated. Included in bit vector table 902 is a vertical column for each interface 904 within a network device. Each horizontal row (such as rows 906 and 908) can be associated with a multipath group of the network device. A value of "1" within a horizontal row can indicate that the multipath group to which the row is associated includes a specific interface. For example, a multipath group associated with row 906 can include interface 1-8. The shaded portions corresponding to 910, 912, and 914 respectively can correspond to a member of a shared-interface list. Furthermore, each member/shaded portion can indicate physical link(s) between two network devices. For example, Shaded portion 910 can correspond to path 212 of FIG. 2 and each of interface 1-8 can correspond to links 220. By implementing the techniques of flowchart 800, a shared-interface list can be generated as illustrated in FIG. 9. Multipath groups of a network device can naturally align to certain ranges of interfaces that correlate to physical paths within a network infrastructure. For example, a spine/leaf network infrastructure, as disclosed herein, can align physical links between network devices with multipath group(s), such as ECMP group(s). Techniques of this disclosure can take advantage of these attributes to simplify statistical information gathering and determination of congestion within a network device of a network infrastructure.

Portion 916 corresponding to shaded area 910 illustrates how steps 806 and 808 can be operable to identify multipath groups that share an interface. For example, rows 906 and 908 share interfaces 1-4, 7, and 8 and therefore would be part of a same member of a multi-interface list. Portion 916 can be searched on a row 918 by column 920 basis to identify multipath groups (rows) that share a same interface (column). As illustrated, multipath groups that share at least one interface can be identified and assigned to a member of a shared-interface list. Shared-interface list 922 is illustrated as including members 924 and 926. Members 924 and 926 can include an identifier (such as a pointer) to multi group(s) that are associated with the member and/or interface range(s). Additionally, each member 924 and 926 can be associated with a corresponding histogram table 928.

Figure 10:
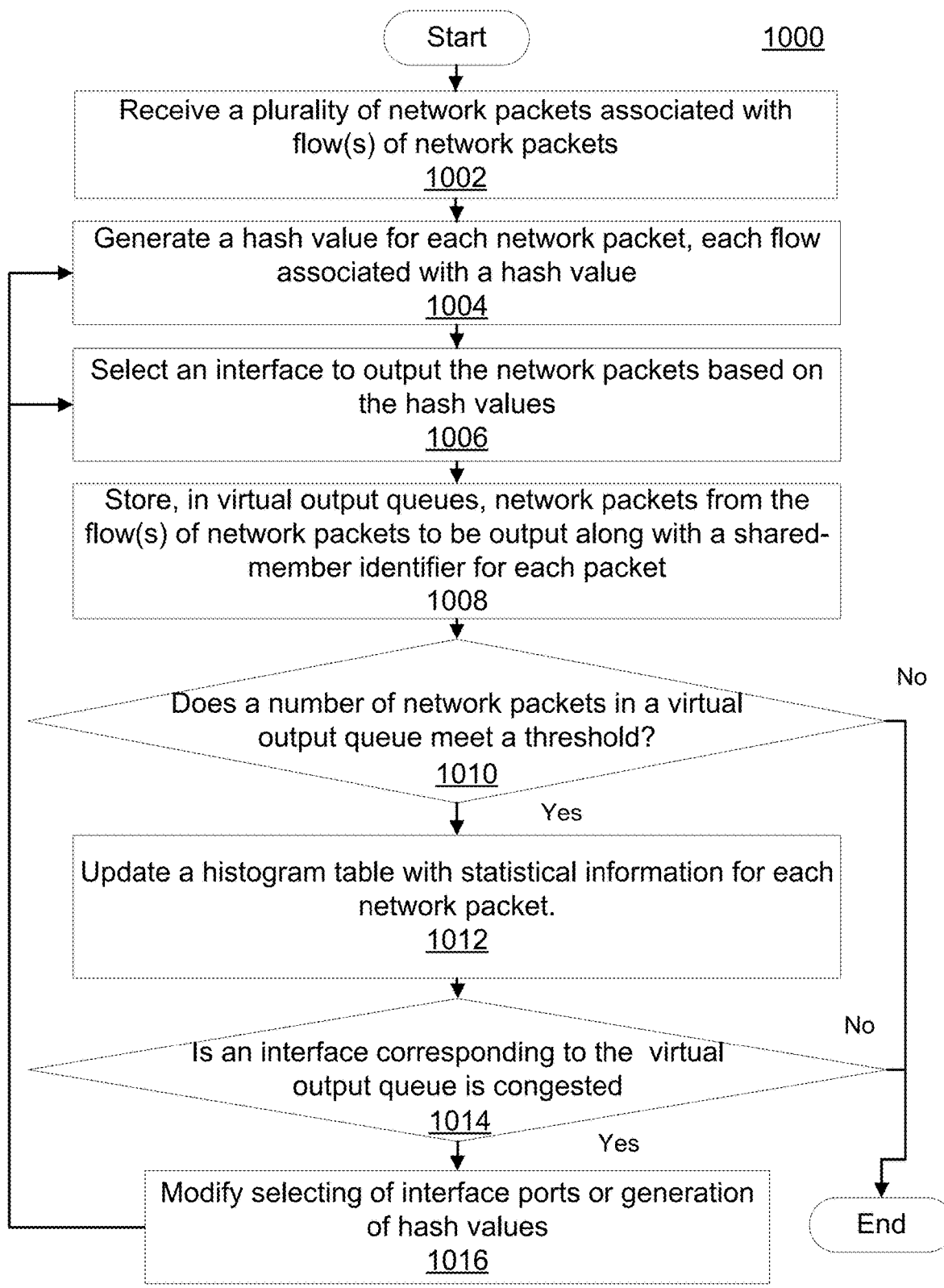
FIG. 10 illustrates a flowchart for implementing congestion detecting and avoidance according to certain embodiments.

FIG. 10 illustrates an example flowchart 1000 for methods for implementing techniques at network devices according to certain embodiments. These methods may be implemented by the devices described herein, such as for example network device 202, 306, 402, 502, or 702. At 1002, a plurality network packets can be received by a network device, the network packets can be associated with flows of network packets. At 1004, hash value(s) can be generated for each of the network packets. At 1006, an interface port can be selected to output each packet. The generating of hash values and selection of ports can use techniques disclosed for operation of network device 502, for example.

At 1008, data from the flows of data can be stored within a virtual output queue, as described herein. At 1010, a determination can be made if a number of packets in a virtual output queue meets a threshold. At 1012, if the number of network packets meet the threshold, then a histogram table can be updated. The histogram table can be located via a shared-interface list member identifier associated with each multipath group or by determining an interface associated with the shared-interface list member. Steps 1010 and 1012 can be performed by Statistics collection logic 738, for example.

At 1014, one or more histograms can be examined to determine if an interface associated with a virtual output queue is experiencing congestion. This determination can be made by, for example, determining if a counter of a histogram table meets a threshold. Alternatively, or additionally, a histogram table can include counters for each of a plurality of time periods. The time periods can be successive or inconsecutive. These counters can be examined over the time periods to determine if an interface is congested. Additionally, a hash value associated with the counter(s) can indicate with flow network packets contributing to congestion belong to. Using this information, at 1016, hash value and/or hash reference ranges can be modified to reroute flow(s) to alternative egress interface(s) of a network device, better distributing the network packets.

Figure 11:
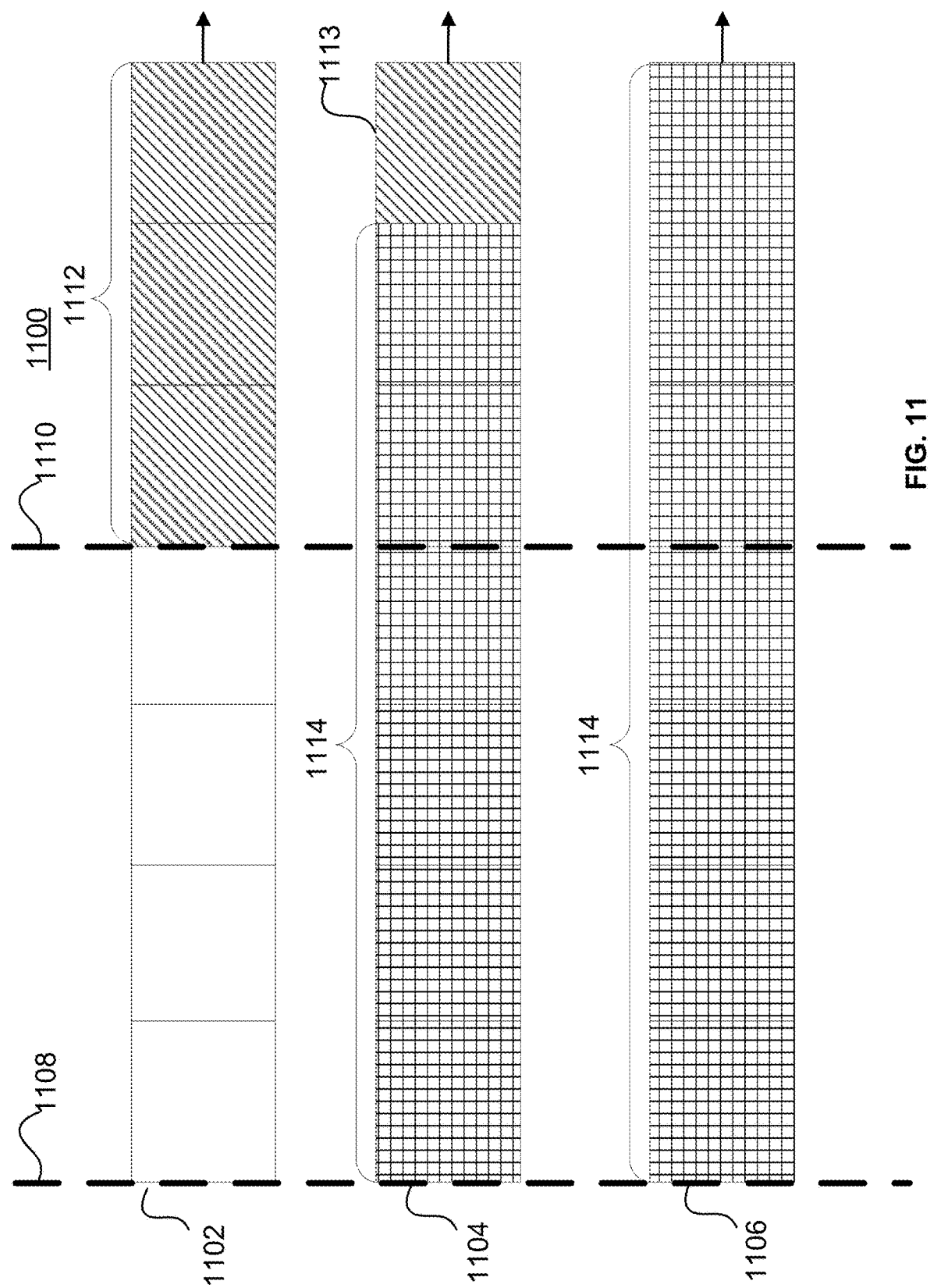
FIG. 11 illustrates states of a virtual output queue according to certain embodiments.

FIG. 11 illustrates a plurality of states 1100 of a virtual output queue. The states are indicates as 1102, 1104, and 1106. State 1102 indicates that data from three stored packets 1112 are stored within the queue. Stored packets 1112 are illustrated as being shaded. The remaining four locations are empty (do not store data from data packets) and are illustrated as not being shaded. Threshold 1110 is a threshold at which congestion can be detected. This threshold can be user assignable, determined by a network device, or preconfigured. When a number of network packets stored within a virtual output queue reaches threshold 1110, a network device can be triggered to accumulate data to populate a histogram table, for example. In this example, each of stored packets 1112 can be analyzed to determine their hash value, source address, destination address, etc. which can be used to identify a flow of network packets to which each network packet is a part of. These flows can then be ranked to identify flows with the highest volume of data stored in a virtual output queue for a given time period. This information can then be used to update histogram table 928, for example.

At state 1104, congestion has proceeded to the point wherein the virtual output queue is full (indicated by reaching threshold 1108). At this point, any new block added to the queue may be dropped and not forwarded to an output port. At state 1104, a count of the number of packets from each flow may not be updated in order to avoid double counting of packet 1113, for example. Packets 1114 may therefore not be counted yet at state 1104. At state 1106, packets 1114 may now be counted as packet 1113 has been routed to an output port. A network device may include rules not to count packets within a queue until already counted packets have left the queue to, for example, avoid double counting of packets. In the alternative, if a new statistics gathering time window has been reached, all of the current packets within a virtual output queue may be counted. Alternatively, they may only be counted if they have exceeded threshold 1110. In still other embodiments, each new packet added to a virtual output queue may be counted.

FIG. 12 illustrates an example histogram table 1200. Histogram table 1200 includes multiple hash values. The hash values can correspond to hash values generated by hashing logic 512, for example. Additionally, each hash value can be associated with a corresponding counter (illustrated horizontally for each hash value). The hit counters can be separated into multiple time periods (indicated vertically by Time T0-T1, T1-T2, etc.). A histogram table similar to histogram table 1220 can be associated with each member of a shared-interface group.

Figure 13:
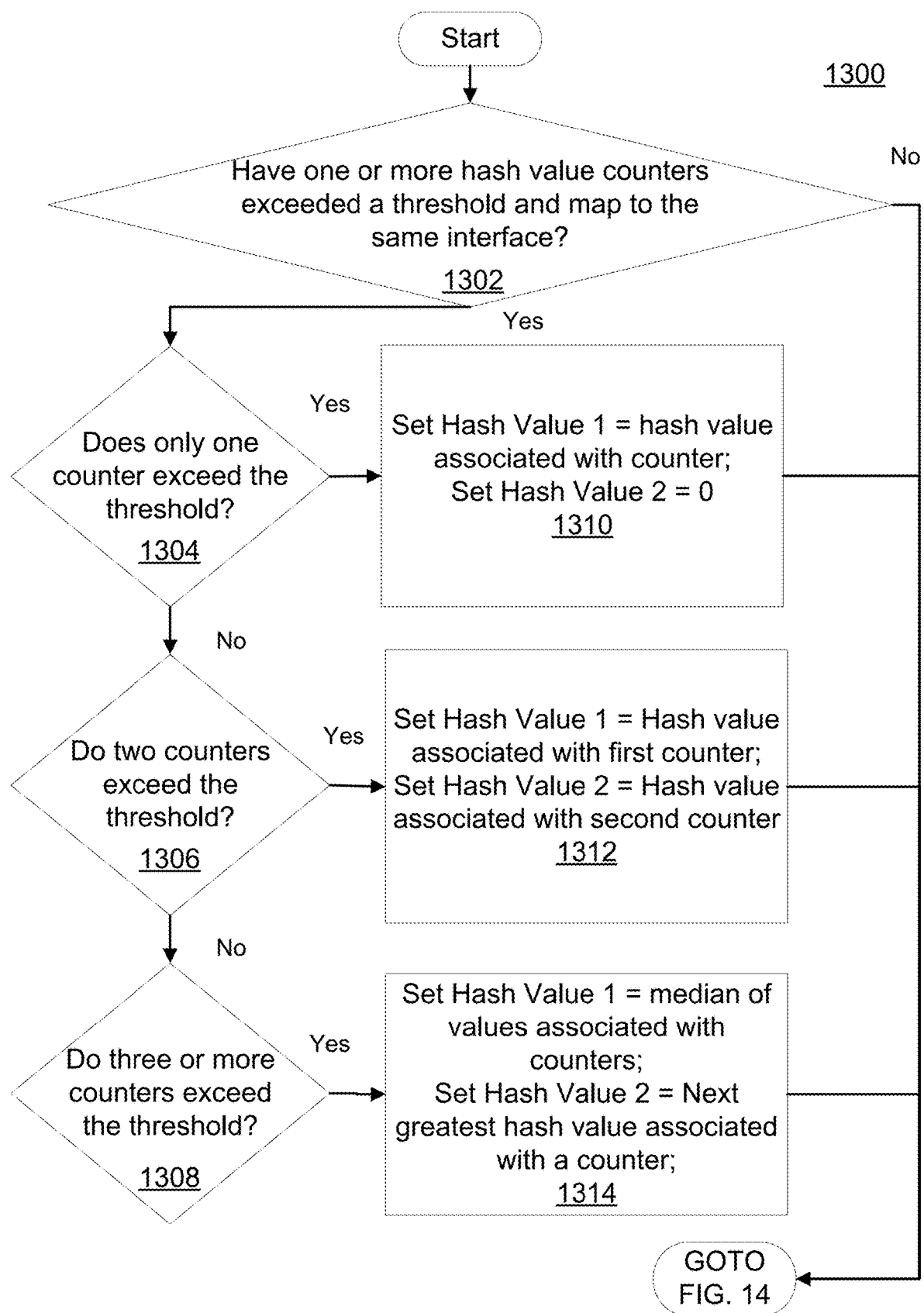
FIGS. 13 & 14 illustrate flowcharts for performing congestion avoidance techniques according to certain embodiments.

FIG. 13 illustrates a flowchart 1300 for techniques for congestion avoidance. Congestion avoidance can be performed by congestion avoidance logic 736, for example. At 1302, a determination can be made if a value of one or more hash value counters of a histogram table has exceeded a threshold and map to the same interface (e.g., fall within a same hash reference range). If not, then no congestion may be detected or need be avoided. If so, then various avoidance techniques can be implemented. At 1304, if only one counter has exceeded the threshold, then this can indicate that one elephant flow is incident upon an interface and is contributing to the detected congestion. If so, then a variable Hash Value 1 can be set to the hash value associated with the counter that has exceeded the threshold and a variable Hash Value 2 can be set to 0. If, at 1306, it is determined that two counters exceeded the threshold, then Hash Value 1 can be populated with a first hash value associated with a first one of the counters and Hash Value 2 can be populated with a second hash value associated with the second one of the counters. If, at 1308, it is determined that three or more counters exceeded the threshold, then Hash Value 1 can be populated with a median value of the hash values associated with the counters and Hash Value 2 can be populated with the next greatest (higher numerically) hash value associated with a counter that has exceeded the threshold. After Hash Value 1 and Hash value 2 are set, flowchart 1300 can proceed to flowchart 1400 of FIG. 14.

Figure 14:
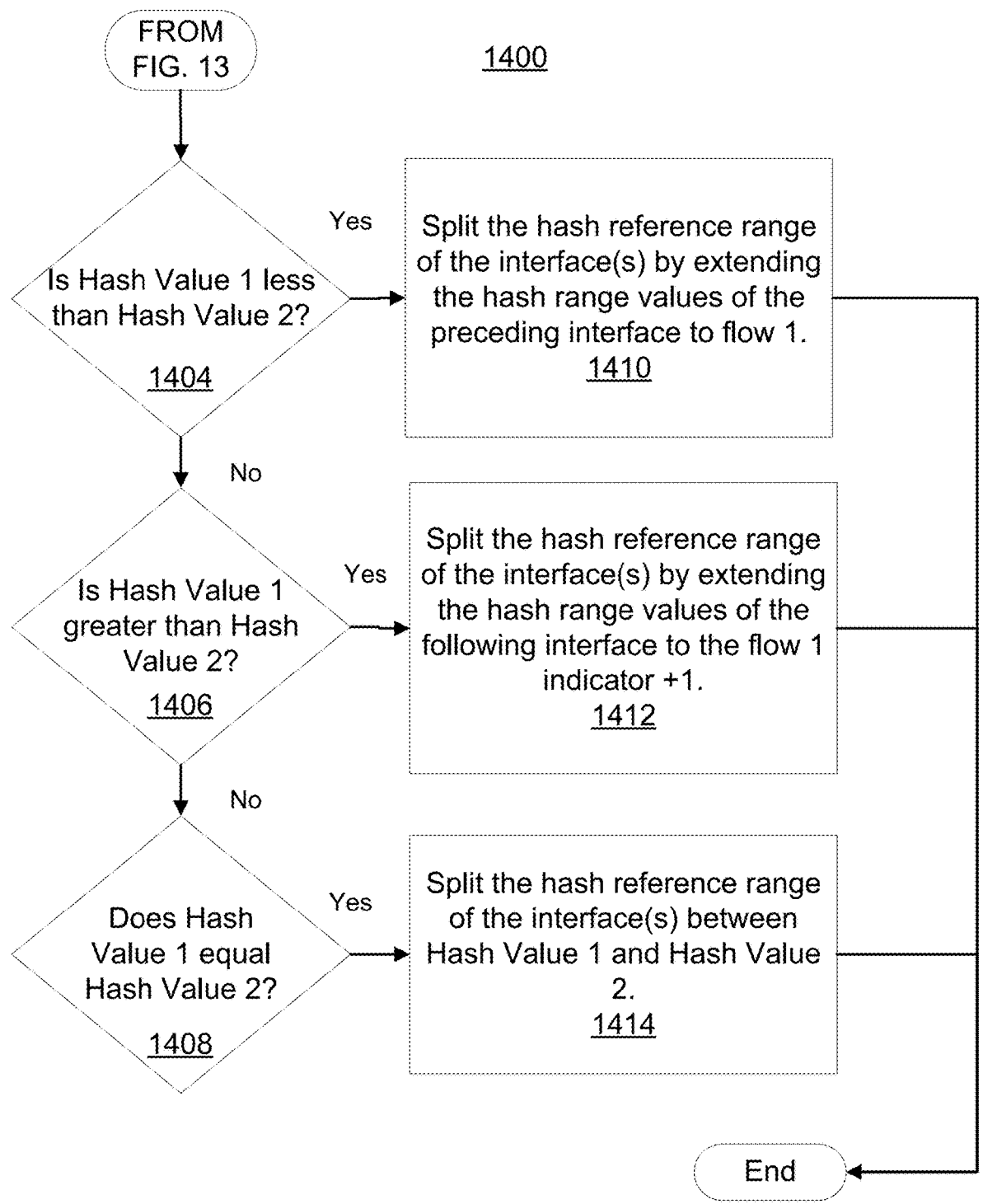

FIG. 14 illustrates an example flowchart 1400 for methods for implementing operation of network devices according to certain embodiments. At 1404, a determination can be made if a value of Hash Value 1 is less than a value of a Hash Value 2. If so, then, at 1410, a range of hash references values associated with an interface indicated by the interface identifier of the congestion control block can be split. This range can be associated with an interface of a single multipath group or an interface shared by several multipath groups (such as multipath groups belonging to the same shared-interface member). The splitting can include extending a hash reference range of a preceding interface hash reference range to the hash reference of flow 1. The remainder of the interface hash reference range can extend from the hash reference of flow 1 to the high end of the hash reference range. In this manner, the hash reference ranges of the two adjacent interfaces can be of different sizes of ranges. The larger flow of data (flow 2) can be kept associated with its original interface whereas the flow 1 can be moved to a preceding interface.

At 1406, a determination can be made if Hash Value 1 is greater than Hash Value 2. If so, flowchart 1400 can proceed to 1412 wherein the hash reference range of the interface can be split. In this instance, the hash reference range can be split from Hash Value 1+1 to the end of the hash reference range of the interface following the interface identifier by the congestion control block as being congested. By extending the flow range from Hash Value 1+1, Flow 1 is not hashed to this hash range. Similar to 1410, 1412 maintains the larger flow of data (flow 1) in the interface and moves flow 2 to the following interface.

At 1408, a determination can be made if Hash Value 1 and Hash Value 2 are equal. If so, then at 1414 the congested interface can be split between Hash Value 1 and Hash Value 2. For example, Hash Value 1 can be added to Hash Value 2 and the summation halved. The interface can then be split into two separate hash reference ranges with each of two flows being directed to a different hash reference range. Optionally, either of these ranges can be merged with an adjacent hash reference range to assign a flow to a different interface as the congested interface.

Figure 15:
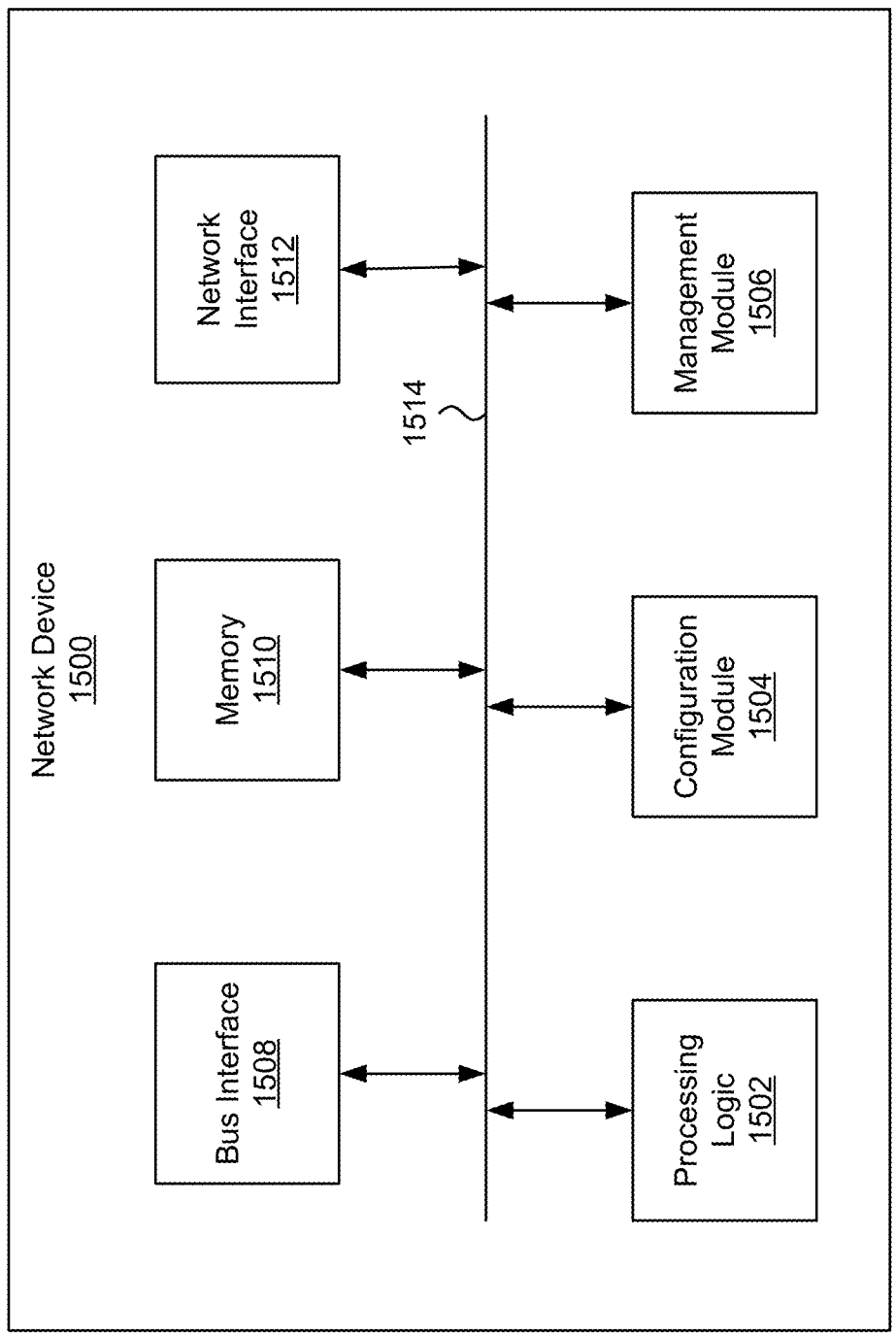
FIG. 15 illustrates an example of a network device, according to certain aspects of the disclosure.

FIG. 15 illustrates an example of a network device 1500. Functionality and/or several components of the network device 1500 may be used without limitation with other embodiments disclosed elsewhere in this disclosure, without limitations. A network device 1500 may facilitate processing of packets and/or forwarding of packets from the network device 1500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1500 may be the recipient and/or generator of packets. In some implementations, the network device 1500 may modify the contents of the packet before forwarding the packet to another device. The network device 1500 may be a peripheral device coupled to another computer device, a switch, a router or any other suitable device enabled for receiving and forwarding packets.

In one example, the network device 1500 may include processing logic 1502, a configuration module 1504, a management module 1506, a bus interface module 1508, memory 1510, and a network interface module 1512. These modules may be hardware modules, software modules, or a combination of hardware and software. In certain instances, modules may be interchangeably used with components or engines, without deviating from the scope of the disclosure. The network device 1500 may include additional modules, not illustrated here, such as components discussed with respect to the nodes disclosed in FIG. 16. In some implementations, the network device 1500 may include fewer modules. In some implementations, one or more of the modules may be combined into one module. One or more of the modules may be in communication with each other over a communication channel 1514. The communication channel 1514 may include one or more busses, meshes, matrices, fabrics, a combination of these communication channels, or some other suitable communication channel.

The processing logic 1502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1502 may be stored on a computer-readable storage medium, for example, in the form of a computer program. The computer-readable storage medium may be non-transitory. In some cases, the computer-readable medium may be part of the memory 1510.

The memory 1510 may include either volatile or non-volatile, or both volatile and non-volatile types of memory. The memory 1510 may, for example, include random access memory (RAM), read only memory (ROM), Electrically Erasable Programmable Read-Only Memory (EEPROM), flash memory, and/or some other suitable storage media. In some cases, some or all of the memory 1510 may be internal to the network device 1500, while in other cases some or all of the memory may be external to the network device 1500. The memory 1510 may store an operating system comprising executable instructions that, when executed by the processing logic 1502, provides the execution environment for executing instructions providing networking functionality for the network device 1500. The memory may also store and maintain several data structures and routing tables for facilitating the functionality of the network device 1500.

In some implementations, the configuration module 1504 may include one or more configuration registers. Configuration registers may control the operations of the network device 1500. In some implementations, one or more bits in the configuration register can represent certain capabilities of the network device 1500. Configuration registers may be programmed by instructions executing in the processing logic 1502, and/or by an external entity, such as a host device, an operating system executing on a host device, and/or a remote device. The configuration module 1504 may further include hardware and/or software that control the operations of the network device 1500.

In some implementations, the management module 1506 may be configured to manage different components of the network device 1500. In some cases, the management module 1506 may configure one or more bits in one or more configuration registers at power up, to enable or disable certain capabilities of the network device 1500. In certain implementations, the management module 1506 may use processing resources from the processing logic 1502. In other implementations, the management module 1506 may have processing logic similar to the processing logic 1502, but segmented away or implemented on a different power plane than the processing logic 1502.

The bus interface module 1508 may enable communication with external entities, such as a host device and/or other components in a computing system, over an external communication medium. The bus interface module 1508 may include a physical interface for connecting to a cable, socket, port, or other connection to the external communication medium. The bus interface module 1508 may further include hardware and/or software to manage incoming and outgoing transactions. The bus interface module 1508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1508 may include the physical layer for any of these bus protocols, including a connector, power management, and error handling, among other things. In some implementations, the network device 1500 may include multiple bus interface modules for communicating with multiple external entities. These multiple bus interface modules may implement the same local bus protocol, different local bus protocols, or a combination of the same and different bus protocols.

The network interface module 1512 may include hardware and/or software for communicating with a network. This network interface module 1512 may, for example, include physical connectors or physical ports for wired connection to a network, and/or antennas for wireless communication to a network. The network interface module 1512 may further include hardware and/or software configured to implement a network protocol stack. The network interface module 1512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1500 may include multiple network interface modules, each configured to communicate with a different network. For example, in these implementations, the network device 1500 may include a network interface module for communicating with a wired Ethernet network, a wireless 802.11 network, a cellular network, an Infiniband network, etc.

The various components and modules of the network device 1500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 16.

Figure 16:
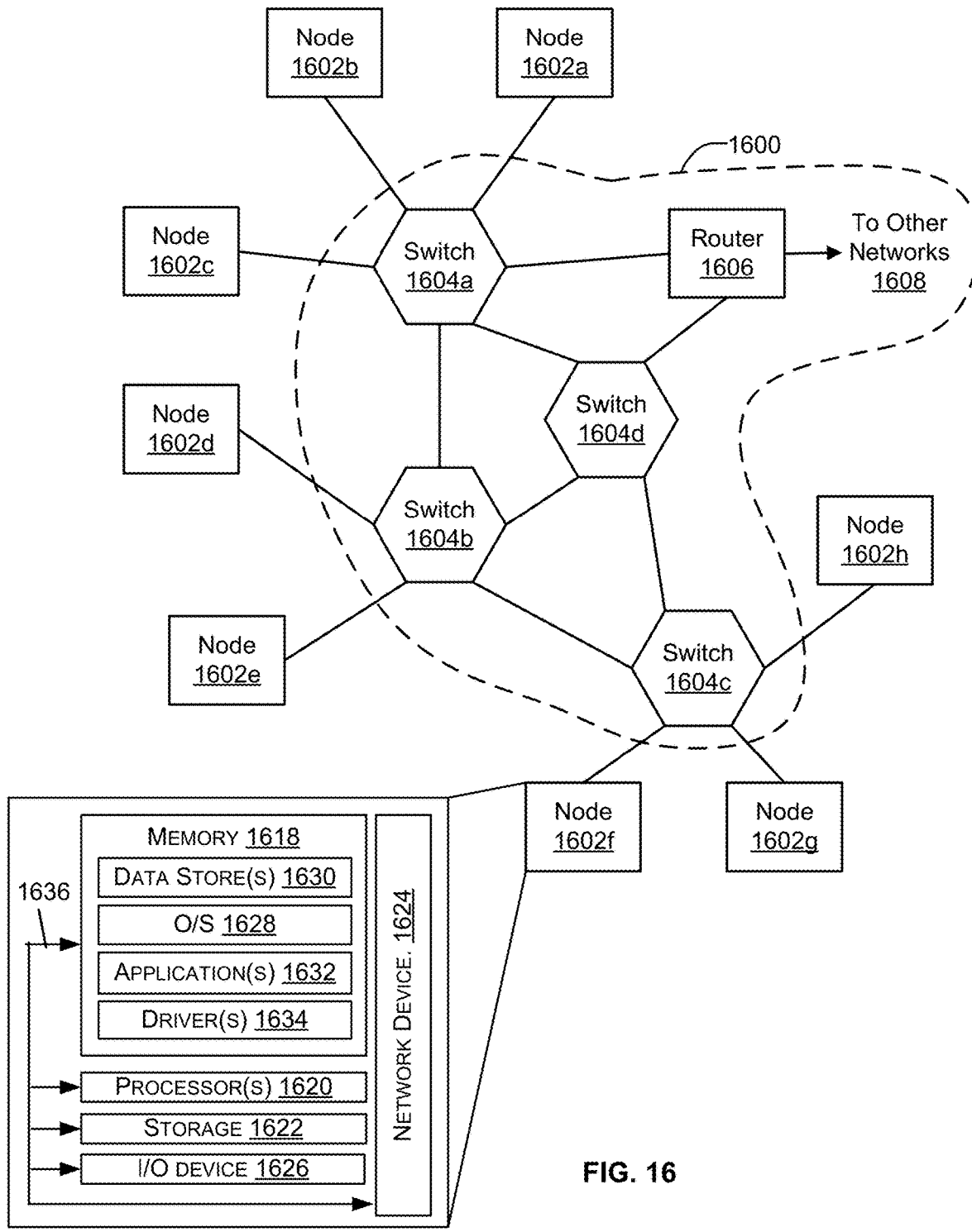
FIG. 16 illustrates an example architecture for features and systems described herein that includes one or more service provider computers and/or a user device connected via one or more networks, according to certain aspects of the disclosure.

FIG. 16 illustrates a network 1600, illustrating various different types of network devices 1500 of FIG. 15, such as nodes comprising the network device, switches and routers. In certain embodiments, the network 1600 may be based on a switched architecture with point-to-point links. As illustrated in FIG. 16, the network 1600 includes a plurality of switches 1604a-1604d, which may be arranged in a network. In some cases, the switches are arranged in a multi-layered network, such as a Clos network. A network device 1500 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1604a-1604d may be connected to a plurality of nodes 1602a-1602h and provide multiple paths between any two nodes.

The network 1600 may also include one or more network devices 1500 for connection with other networks 1608, such as other subnets, LANs, wide area networks (WANs), or the Internet, and may be referred to as routers 1606. Routers use headers and forwarding tables to determine the best path for forwarding the packets, and use protocols such as internet control message protocol (ICMP) to communicate with each other and configure the best route between any two devices.

In some examples, network(s) 1600 may include any one or a combination of many different types of networks, such as cable networks, the Internet, wireless networks, cellular networks and other private and/or public networks. Interconnected switches 1604a-1604d and router 1606, if present, may be referred to as a switch fabric, a fabric, a network fabric, or simply a network. In the context of a computer network, terms "fabric" and "network" may be used interchangeably herein.

Nodes 1602a-1602h may be any combination of host systems, processor nodes, storage subsystems, and I/O chassis that represent user devices, service provider computers or third party computers.

User devices may include computing devices to access an application 1632 (e.g., a web browser or mobile device application). In some aspects, the application 1632 may be hosted, managed, and/or provided by a computing resources service or service provider. The application 1632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1608. Additionally, the user device(s) may be part of the distributed system managed by, controlled by, or otherwise part of the service provider computer(s) (e.g., a console device integrated with the service provider computers).

The node(s) of FIG. 16 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1602a-1602h may include at least one memory 1618 and one or more processing units (or processor(s) 1620). The processor(s) 1620 may be implemented in hardware, computer-executable instructions, firmware, or combinations thereof. Computer-executable instruction or firmware implementations of the processor(s) 1620 may include computer-executable or machine-executable instructions written in any suitable programming language to perform the various functions described.

In some instances, the hardware processor(s) 1620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1618 may store program instructions that are loadable and executable on the processor(s) 1620, as well as data generated during the execution of these programs. Depending on the configuration and type of the node(s) 1602a-1602h, the memory 1618 may be volatile (such as RAM) and/or non-volatile (such as ROM, flash memory, etc.). The memory 1618 may include an operating system 1628, one or more data stores 1630, one or more application programs 1632, one or more drivers 1634, and/or services for implementing the features disclosed herein.

The operating system 1628 may support nodes 1602*a*-1602*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1628 may also be a proprietary operating system.

The data stores 1630 may include permanent or transitory data used and/or operated on by the operating system 1628, application programs 1632, or drivers 1634. Examples of such data include web pages, video data, audio data, images, user data, and so on. The information in the data stores 1630 may, in some implementations, be provided over the network(s) 1608 to user devices 1604. In some cases, the data stores 1630 may additionally or alternatively include stored application programs and/or drivers. Alternatively or additionally, the data stores 1630 may store standard and/or proprietary software libraries, and/or standard and/or proprietary application user interface (API) libraries. Information stored in the data stores 1630 may be machine-readable object code, source code, interpreted code, or intermediate code.

The drivers 1634 include programs that may provide communication between components in a node. For example, some drivers 1634 may provide communication between the operating system 1628 and additional storage 1622, network device 1624, and/or I/O device 1626. Alternatively or additionally, some drivers 1634 may provide communication between application programs 1632 and the operating system 1628, and/or application programs 1632 and peripheral devices accessible to the service provider computer. In many cases, the drivers 1634 may include drivers that provide well-understood functionality (e.g., printer drivers, display drivers, hard disk drivers, Solid State Device drivers). In other cases, the drivers 1634 may provide proprietary or specialized functionality.

The service provider computer(s) or servers may also include additional storage 1622, which may include removable storage and/or non-removable storage. The additional storage 1622 may include magnetic storage, optical disks, solid state disks, flash memory, and/or tape storage. The additional storage 1622 may be housed in the same chassis as the node(s) 1602*a*-1602*h* or may be in an external enclosure. The memory 1618 and/or additional storage 1622 and their associated computer-readable media may provide non-volatile storage of computer-readable instructions, data structures, program modules, and other data for the computing devices. In some implementations, the memory 1618 may include multiple different types of memory, such as SRAM, DRAM, or ROM.

The memory 1618 and the additional storage 1622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1618 and the additional storage 1622 are examples of computer storage media. Additional types of computer storage media that may be present in the node(s) 1602*a*-1602*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1602*a*-1602*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1602*a*-1602*h* may also include I/O device(s) 1626, such as a keyboard, a mouse, a pen, a voice input device, a touch input device, a display, speakers, a printer, and the like. The node(s) 1602*a*-1602*h* may also include one or more communication channels 1636. A communication channel 1636 may provide a medium over which the various components of the node(s) 1602*a*-1602*h* can communicate. The communication channel or channels 1636 may take the form of a bus, a ring, a switching fabric, or a network.

The node(s) 1602*a*-1602*h* may also contain network device(s) 1624 that allow the node(s) 1602*a*-1602*h* to communicate with a stored database, another computing device or server, user terminals and/or other devices on the network(s) 1600. The network device(s) 1624 of FIG. 16 may include similar components discussed with reference to the network device 1500 of FIG. 15.

In some implementations, the network device 1624 is a peripheral device, such as a PCI-based device. In these implementations, the network device 1624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1508 may implement NVMe, and the network device 1624 may be connected to a computing system using a PCIe interface.

A PCI-based device may include one or more functions. A "function" describes operations that may be provided by the network device 1624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 15, FIG. 16, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device, comprising:
   interfaces mapped to multipath groups and configured to output network packets of the multipath groups;
   a memory configured to store a shared-interface list comprising members, each member comprising a group of multipath groups being mapped to at least one interface of the interfaces, the shared-interface list further identifying the at least one interface of the interfaces mapped to the each member; and
   process logic configured to:
      identify, based on the shared-interface list, a first interface of the interfaces mapped to a subset of the multipath groups;
      identify first statistical information of at least some of the network packets based on identifying, from the shared-interface list, a first member comprising the subset of the multipath groups mapped to the first interface, the first member being associated with second statistical information;
      determine, based on the first statistical information, that the first interface is congested; and
      update a distribution of the network packets among the interfaces based on determining that the first interface is congested.

2. The device of claim 1,
   wherein each member of the shared-interface list is associated with the second statistical information of a subset of the network packets output by the at least one interface; and wherein the first statistical information is identified based on identifying the first member of the shared-interface list mapped to the first interface and the second statistical information associated with the first member.

3. The device of claim 2, wherein the first statistical information is identified based on identifying at least one multipath group of the at least some of the network packets and identifying one or more members of the shared-interface list comprising the at least one multipath group.

4. The device of claim 1, wherein the memory is configured to store a bit vector for each of the multipath groups, the bit vector indicating one or more of the interfaces mapped to the each of the multipath groups;

wherein the shared-interface list is generated based on the bit vectors.

5. The device of claim 1, wherein the at least one interface of each member of the shared-interface list is different.

6. The device of claim 1, wherein each interface of the interfaces is assigned to a hash value range; and wherein the processing logic is configured to:
determine a hash value for each network packet of the network packets; and
forward a network packet of the network packets to the first interface based the hash value of the network packet being within the hash value range of the first interface.

7. The device of claim 6, wherein at least one of the first statistical information or the second statistical information comprise a hit count for a hash value included in the hash value range of at least one interface of the interfaces.

8. The device of claim 7, wherein at least one of the first statistical information or the second statistical information comprise hit counts for the hash value for multiple time periods.

9. The device of claim 7, wherein the processing logic is configured to determine that the first interface is congested based on a hit count for a hash value included in a hash range of the first interface exceeding a threshold.

10. The device of claim 9, wherein the processing logic is configured to update the distribution of the network packets among the interfaces based on updating at least the hash range of the first interface.

11. The device of claim 10, wherein the processing logic is configured to adjust the hash value range of the first interface based on a number of hit counts in the first statistical information exceeding the threshold and based on the hash values associated with the number of hit counts.

12. The device of claim 6, wherein the processing logic is configured to update at least one hit count in the first statistical information based on a number of the at least some of the network packets, stored in an output queue and associated with the first interface, exceeding a threshold.

13. A method comprising:
storing, at a memory, a shared-interface list comprising members, each member comprising a group of multipath groups being mapped to at least one interface of the interfaces, the shared-interface list further identifying the at least one interface of the interfaces mapped to the each member;
identifying, based on the shared-interface list, a first interface mapped to a subset of the multipath groups, the first interface being identified from interfaces mapped to the multipath groups, the interfaces being configured to output network packets of the multipath group;
identifying first statistical information of at least some of the network packets based on identifying, from the shared-interface list, a first member comprising the subset of the multipath groups mapped to the first interface, the first member being associated with second statistical information;
determining, based on the first statistical information, that the first interface is congested; and
updating a distribution of the network packets among the interfaces based on determining that the first interface is congested.

14. The method of claim 13,
wherein each member of the shared-interface list is associated with the second statistical information of a subset of the network packets output by the at least one interface; and
wherein the first statistical information is identified based on identifying the first member of the shared-interface list mapped to the first interface and the second statistical information associated with the first member.

15. The method of claim 14, wherein the first statistical information is identified based on identifying at least one multipath group of the at least some of the network packets and identifying one or more members of the shared-interface list comprising the at least one multipath group.

16. The method of claim 13, further comprising:
assigning a hash value range to each interface of the interfaces;
determining a hash value for each network packet of the network packets; and
forwarding a network packet of the network packets to the first interface based the hash value of the network packet being within the hash value range of the first interface.

17. The method of claim 16, wherein at least one of the first statistical information or the second statistical information comprises a hit count for a hash value included in the hash value range of at least one interface of the interfaces.

18. The method of claim 17, wherein determining, based on first the statistical information, that the first interface is congested comprises: determining that the first interface is congested based on a hit count for a hash value included in a hash range of the first interface exceeding a threshold.

* * * * *